United States Patent [19]

Albonesi et al.

[11] Patent Number: 5,113,514
[45] Date of Patent: May 12, 1992

[54] SYSTEM BUS FOR MULTIPROCESSOR COMPUTER SYSTEM

[75] Inventors: David H. Albonesi, Hudson; Brian K. Langendorf, Shrewsbury, both of Mass.; John Chang, Morton Grove, Ill.; John G. Faase, Palo Alto, Calif.; Michael J. Homberg, Grafton, Mass.

[73] Assignee: Prime Computer, Inc., Framingham, Mass.

[21] Appl. No.: 482,288

[22] Filed: Feb. 20, 1990

Related U.S. Application Data

[63] Continuation of Ser. No. 397,124, Aug. 22, 1989, abandoned.

[51] Int. Cl.⁵ .................. G06F 12/00; G06F 13/00
[52] U.S. Cl. .................................. 395/425
[58] Field of Search ............................ 365/49

[56] References Cited

U.S. PATENT DOCUMENTS

| 4,785,394 | 11/1988 | Fischer | 364/200 |
| 4,785,395 | 11/1988 | Keeley | 364/200 |
| 4,928,225 | 5/1990 | McCarthy et al. | 364/200 |

OTHER PUBLICATIONS

J. Archibald & J. Baer, Cache Coherence Protocols: Evaluation Using A Multiprocessor Simulation Model, ACM Transactions on Computer Systems, vol. 4, No. 4 (Nov. 1986).

*Primary Examiner*—Alyssa H. Bowler
*Attorney, Agent, or Firm*—Wolf, Greenfield & Sacks

[57] ABSTRACT

The invention comprises a system bus apparatus and method for a multi-arm, multiprocessor computer system having a main memory and localized buffer cache memories at each processor. Each block of data in a cache includes tag bits which identifies the condition of the data block in relation to the corresponding data in main memory and other caches. The system bus (SYSBUS) comprises three subparts; 1) a MESSAGE/DATA bus, 2) a REQUEST/GRANT bus and 3) a BCU bus. The MESSAGE/DATA bus is coupled to every device on the system and is used for transferring messages, data and addresses. The REQUEST/GRANT bus couples between every device on an arm of the system and that arm's bus control unit (BCU). The BCU bus couples between the various BCUs. Both the MESSAGE/DATA bus and the BCU bus include ACK/NACK/HIT bits which are used when responding to messages received over the SYSBUS to inform the message-issuing device if the devices received the message and, if so, the condition of the data in relation to other caches and main memory. The protocol allows inconsistent copies of data to exist and prevents stale data from being used erroneously by monitoring the tag bits and the ACK/NACK/HIT bits. Further, under the appropriate conditions, a copy of the most recent data block may be transferred from one cache to another (with appropriate updating of tags) without updating the main memory. When a memory operation will bring about a situation where cache coherence can no longer be maintained, main memory is updated with the most recent copy of the data and the other caches are either updated or tagged as invalid.

28 Claims, 17 Drawing Sheets

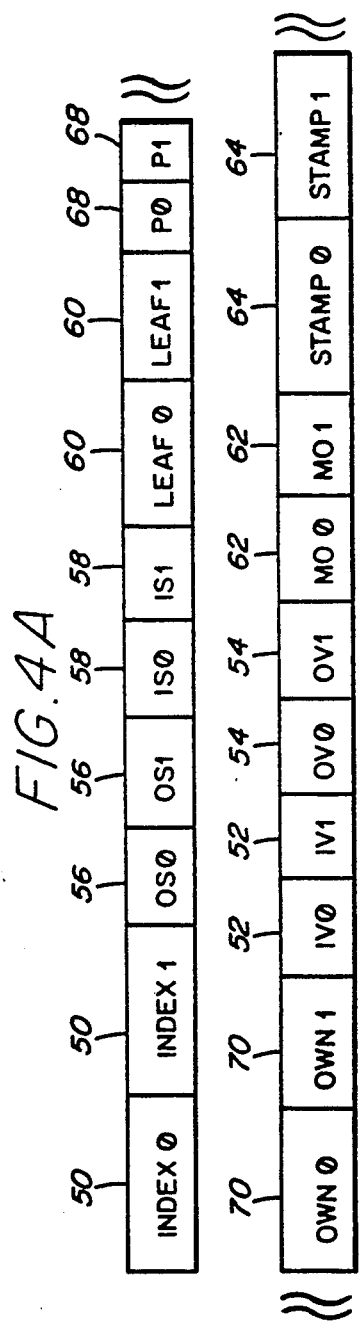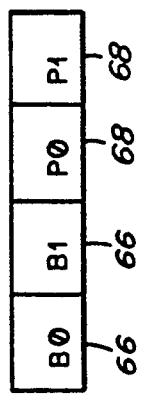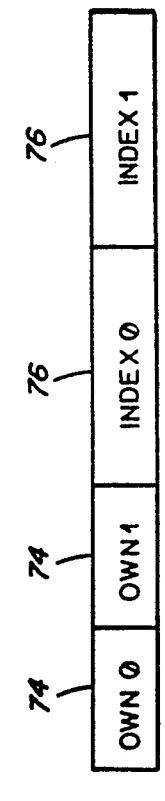

| STATE NO. | INST. CACHE | OP. CACHE | SEC. CACHE |
| --- | --- | --- | --- |
| 1 | INVALID | INVALID | INVALID |
| 2 | INVALID | INVALID | SHARED |
| 3 | SHARED | INVALID | SHARED |
| 4 | INVALID | SHARED | SHARED |
| 5 | SHARED | SHARED | SHARED |
| 6 | INVALID | INVALID | PRIVATE |
| 7 | SHARED | INVALID | PRIVATE |
| 8 | INVALID | SHARED | PRIVATE |
| 9 | SHARED | SHARED | PRIVATE |
| 10 | INVALID | INVALID | MODIFIED |
| 11 | SHARED | INVALID | MODIFIED |
| 12 | INVALID | SHARED | MODIFIED |
| 13 | SHARED | SHARED | MODIFIED |
| 14 | INVALID | MODIFIED | MODIFIED |

*FIG.5*

```
MESSAGE/DATA BUS:
DATA MODE:        DATA             64 BITS BIDIRECTIONAL,MULTI-DROP
                  PARITY           8  BITS BIDIRECTIONAL,MULTI-DROP
MESSAGE MODE:     MESSAGE          48 BITS BIDIRECTIONAL,MULTI-DROP
                  OPERATION TYPE   6  BITS BIDIRECTIONAL,MULTI-DROP
                  SOURCE ID        5  BITS BIDIRECTIONAL,MULTI-DROP
                  DESTINATION ID   5  BITS BIDIRECTIONAL,MULTI-DROP
                  PARITY           8  BITS BIDIRECTIONAL,MULTI-DROP
OTHER MESSAGE SIGNALS:
                  VALID MESSAGE    2  BITS BIDIRECTIONAL,MULTI-DROP
                  ACK/NACK/HIT IN  28 BITS UNIDIRECTIONAL,SINGLE-DROP
                                   (4 BITS/DEVICE,7 DEVICES/ARM)
                  ACK/NACK/HIT OUT 4  BITS UNIDIRECTIONAL,MULTI-DROP
REQUEST/GRANT     BUS REQUEST      28 BITS UNIDIRECTIONAL,SINGLE-DROP
                                   (4 BITS/DEVICE,7 DEVICES/ARM
                  GRANT            7  BITS UNIDIRECTIONAL,SINGLE-DROP
                                   (1 BITS/DEVICE,7 DEVICES/ARM
BCU BUS:          ACTIVE REQUEST   10 BITS UNIDIRECTIONAL,SINGLE-DROP,
                                   DIFFERENTIAL (5 BITS/ARM,2 ARMS)
                  ACTIVE GRANT     2 BITS,UNIDIRECTIONAL,SINGLE-DROP
                                   DIFFERENTIAL (1 BIT/ARM,2 ARMS)
                  BCU ACK/NACK/HIT 8 BITS,UNIDIRECTIONAL,SINGLE-DROP
                                   DIFFERENTIAL (4 BITS/ARM,2 ARMS)
PDA:              TRIGGERED IN/OUT 1 BIT BIDIRECTIONAL,MULTI-DROP
```

*FIG.7*

```
ANHP
CAIA
KCTR
 K I
   T
   Y
```

| | | |
|---|---|---|
| 0000 | NO OPERATION | THIS CODE SPECIFIES THAT THE DEVICE IS NOT RESPONDING TO A MESSAGE. |
| 0001 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 0010 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 0011 | HIT | THIS CODE TELLS THE BCU THAT THE RECEIVER HAS A SHARED COPY OF THE DATA REQUESTED. |
| 0100 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 0101 | MESSAGE NOT ACKOWLEDGED | THIS CODE TELLS THE BCU THAT THE RECEIVER HAS NOT CORRECTLY RECEIVED THE MESSAGE. |
| 0110 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 0111 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 1000 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 1001 | ACK/UNIQUE | THIS CODE TELLS THE BCU THAT THE RECEIVER HAS CORRECTLY RECEIVED THE MESSAGE OR THE RECEIVER HAS A UNIQUE COPY OF THE DATA. |
| 1010 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 1011 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 1100 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 1101 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 1110 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 1111 | ERROR-SYSBUS-HALT | THIS CODE IS AN ERROR AND CANNOT BE RECOVERED FROM, SYSBUS MUST BE HALTED AND MAINTENANCE PROCESSOR NOTIFIED. |

FIG.8

```
ANHP
CAIA
KCTR
 K I
   T
   Y
```

| Code | Name | Description |
|---|---|---|
| 0000 | NO OPERATION | THIS CODE SPECIFIES THAT ALL DEVICES ARE NOT RESPONDING TO A MESSAGE. |
| 0001 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 0010 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 0011 | HIT | THIS CODE TELLS ALL DEVICES THAT THE RECEIVER HAS A SHARED COPY OF THE DATA REQUESTED. |
| 0100 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 0101 | MESSAGE NOT ACKNOWLEDGED | THIS CODE TELLS ALL DEVICES THAT THE RECEIVER HAS NOT CORRECTLY RECEIVED THE MESSAGE. |
| 0110 | MESSAGE NACK AND HIT | THIS CODE TELLS ALL DEVICES THAT THERE WAS A NACK AND A HIT FROM THE DEVICES ON THE SYSBUS. |
| 0111 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 1000 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 1001 | ACK/UNIQUE | THIS CODE TELLS ALL DEVICES THAT THE RECEIVER HAS CORRECTLY RECEIVED THE MESSAGE OR THE RECEIVER HAS A UNIQUE COPY OF THE DATA. |
| 1010 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 1011 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 1100 | MESSAGE ACK AND NACK | THIS CODE IS USED TO TELL ALL DEVICES THAT THERE WAS AN ACK AND A NACK IN RESPONSE TO THE MESSAGE. |
| 1101 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 1110 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |
| 1111 | ERROR-SYSBUS HALT | THIS CODE IS AN ERROR AND CANNOT BE RECOVERED FROM, SYSBUS MUST BE HALTED AND MAINTENANCE PROCESSOR NOTIFIED. |

FIG.9

REQUESTS
HALT REQUEST 1111
    1111 HALT REQUEST X CYCLES
            THIS REQUEST IS USED TO NOTIFY THE BCU THAT A CRITICAL
            ERROR HAS OCCURRED AND THAT IT SHOULD NOT GRANT THE BUS
            FOR ANY REASON.

BLOCK WRITE REQUESTS 1110-1100
    1110 WRITE BACK 9 CYCLES
            THIS IS THE HIGHEST PRIORITY WRITE REQUEST. IT IS ONLY
            USED IF THE WRITE PART OF THE READ+WRITEBACK INSTRUC-
            TION IS NACKED.

1101 HIGH PRIORITY BLOCK WRITE REQUEST 9 CYCLES
            THIS REQUEST IS USED WHEN A CACHE NEEDS TO WRITE DATA
            OUT QUICKLY. FOR EXAMPLE IN THE CASE WHERE THE CACHE LO-
            CATION IS NEEDED FOR OTHER DATA. GIVEN A GRANT THE DE-
            VICE WILL RESPOND WITH A WRITE MESSAGE AND THE DATA
            WILL FOLLOW THE MESSAGE ON THE BUS.

1100 LOW PRIORITY BLOCK WRITE REQUEST 9 CYCLES
            THIS REQUEST IS USED BY THE IOP DURING INACTIVE TIME TO
            EMPTY OUT ITS CACHE. GIVEN A GRANT THE DEVICE WILL RE-
            SPOND WITH A WRITE MESSAGE AND THE DATA WILL FOLLOW THE
            MESSAGE ON THE BUS.

MESSAGE REQUESTS 101X
    1011 INVALIDATION REQUEST 2 CYCLES
            THIS REQUEST IS USED WHEN A DEVICE WANTS TO REQUEST A
            UNIQUE COPY OF A BLOCK OF DATA. UPON A GRANT THE DEVICE
            WILL SEND OUT AN INVALIDATION MESSAGE TO ALL OTHER DE-
            VICES.
    1010 GENERIC MESSAGE REQUEST 1 CYCLE
            THIS IS USED WHEN A DEVICE WANTS TO SEND OUT ANY TYPE
            OF MESSAGE EXCEPT HALT OR INVALIDATE.

*FIG.10A*

BLOCK READ+WRITEBACK REQUESTS 1001-0110
   1001 HIGH PRIORITY BLOCK READ+INVALIDATE+WRITEBACK 11 CYCLES
              THIS REQUEST IS USED WHEN A DEVICE WANTS TO READ IN
              DATA TO A LOCATION IN THE CACHE THAT HAS TO BE WRITTEN
              TO MAIN MEMORY FIRST.IT IS HIGH PRIORITY AND SENDS BACK
              A UNIQUE COPY OF THE DATA.

1000 LOW PRIORITY BLOCK READ+INVALIDATE+WRITEBACK 11 CYCLES
              THIS REQUEST IS USED WHEN A DEVICE WANTS TO READ IN
              DATA TO A LOCATION IN THE CACHE THAT HAS TO BE WRITTEN
              TO MAIN MEMORY FIRST. IT IS LOW PRIORITY AND SENDS BACK
              A UNIQUE COPY OF THE DATA.

0111 HIGH PRIORITY BLOCK READ+WRITEBACK 11 CYCLES
              THIS REQUEST IS USED WHEN A DEVICE WANTS TO READ IN
              DATA TO A LOCATION IN THE CACHE THAT HAS TO BE WRITTEN
              TO MAIN MEMORY FIRST.IT IS HIGH PRIORITY.

0110 LOW PRIORITY BLOCK READ+WRITEBACK 11 CYCLES
              THIS REQUEST IS USED WHEN A DEVICE WANTS TO READ IN
              DATA TO A LOCATION IN THE CACHE THAT HAS TO BE WRITTEN
              TO MAIN MEMORY FIRST.IT IS LOW PRIORITY.

READ REQUESTS 0101-0010
   0101 HIGH PRIORITY BLOCK READ+INVALIDATE REQUEST 2 CYCLES
              THIS IS USED WHEN A DEVICE NEEDS A UNIQUE COPY OF DATA
              IMMEDIATELY.

0100 LOW PRIORITY BLOCK READ+INVALIDATE REQUEST 2 CYCLES
              THIS REQUEST IS USED BY THE IOPS TO PREFETCH UNIQUE
              DATA FOR A DISK WRITE WHEN THE TIME TO GET THE DATA IS
              NOT CRITICAL.

0011 HIGH PRIORITY BLOCK READ REQUEST 2 CYCLE
              THIS IS USED WHEN A DEVICE NEEDS DATA IMMEDIATELY.

0010 LOW PRIORITY BLOCK READ REQUEST 2 CYCLE
              THIS REQUEST IS USED BY THE IOPS TO PREFETCH DATA FOR
              A DISK WRITE WHEN THE TIME TO GET THE DATA IS NOT CRIT-
              -ICAL.

0000 NO BUS REQUEST
              THE NO BUS REQUEST CODE IS PUT ON A DEVICE'S REQUEST
              LINES IF THE DEVICE HAS NO REQUESTS.

FIG.10B

| INSTRUCTION | HIT | ACK | NACK | WHAT HAPPENED | SENDER RESPONSE |
|---|---|---|---|---|---|
| READ | 0 | 0 | 0 | DATA NOT IN CACHE | WAIT FOR DATA(MEMORY UNQ.) |
|  | 0 | 0 | 1 | MEMORY AND/OR CACHE NACKED | RESEND MESSAGE |
|  | 0 | 1 | 0 | CACHE HAS UNIQUE | WAIT FOR DATA(CACHE SH.) |
|  | 0 | 1 | 1 | CACHE HAS UNIQUE/ MEMORY NACKED | WAIT FOR DATA(CACHE SH.) |
|  | 1 | 0 | 0 | DATA IN CACHES SHARED | WAIT FOR DATA(MEMORY SH.) |
|  | 1 | 0 | 1 | CACHE AND/OR MEMORY NACKED | RESEND MESSAGE |
|  | 1 | 1 | 0 | CASE DOES NOT EXIST | ERROR |
|  | 1 | 1 | 1 | CASE DOES NOT EXIST | ERROR |
| READ +INV | 0 | 0 | 0 | DATA NOT IN CACHE | WAIT FOR DATA(MEMORY UNQ.) |
|  | 0 | 0 | 1 | MEMORY AND/OR CACHE NACKED | RESEND MESSAGE |
|  | 0 | 1 | 0 | CACHE HAS UNIQUE | WAIT FOR DATA(CACHE UNQ.) |
|  | 0 | 1 | 1 | CACHE HAS UNIQUE/ MEMORY NACKED | WAIT FOR DATA(CACHE UNQ.) |
|  | 1 | 0 | 0 | DATA IN CACHES SHARED | WAIT FOR DATA(MEMORY UNQ.) |
|  | 1 | 0 | 1 | CACHE AND/OR MEMORY NACKED | RESEND |
|  | 1 | 1 | 0 | CASE DOES NOT EXIST | ERROR |
|  | 1 | 1 | 1 | CASE DOES NOT EXIST | ERROR |
| SECOND CYCLE WRITE BACK | 0 | 0 | 0 | EVERYTHING IS OK | MEMORY ACCEPTS WRITEBACK |
|  | 0 | 0 | 1 | MEMORY NACKS WRITEBACK | RESEND(HIGH PRIOR.WRITEBACK) |
|  | 0 | 1 | X | CASE DOES NOT EXIST | ERROR |
|  | 1 | X | X | CASE DOES NOT EXIST | ERROR |
| WRITE TO DEVICE | 0 | 0 | 0 | CASE DOES NOT EXIST | ERROR |
|  | 0 | 0 | 1 | CANNOT HAPPEN RESERVED | RESEND(FOR HALT PURPOSES) |
|  | 0 | 1 | 0 | OK | DONE |
|  | 0 | 1 | 1 | CASE DOES NOT EXIST | ERROR |
|  | 1 | X | X | CASE DOES NOT EXIST | ERROR |
| WRITE TO MEMORY (WRITEBACK) | 0 | 0 | 0 | OK | DONE |
|  | 0 | 1 | X | MEMORY BUSY | RESEND |
|  | 0 | 1 | X | CASE DOES NOT EXIST | ERROR |
|  | 1 | X | X | CASE DOES NOT EXIST | ERROR |
| WRITE TO DEVICE+ MEMORY (WRITE AND WRITEBACK) | 0 | 0 | 0 | CASE DOES NOT EXIST | ERROR |
|  | 0 | 0 | 1 | CASE DOES NOT EXIST | RESEND(HALT PURPOSES ONLY) |
|  | 0 | 1 | 0 | OK | DONE |
|  | 0 | 1 | 1 | MEMORY BUSY | SEND TO MEMORY ONLY |
|  | 1 | X | X | CASE DOES NOT EXIST | ERROR |
| HALT | X | X | X | SYSTEM HALT | HALT BUS ACTIVITIES |
| INVALIDATE | 0 | X | X | CASE DOES NOT EXIST | ERROR |
|  | 1 | 0 | 0 | OK | DONE |
|  | 1 | 0 | 1 | CACHE NACKED | RESEND |
|  | 1 | 1 | X | CASE DOES NOT EXIST | ERROR |

*FIG.11*

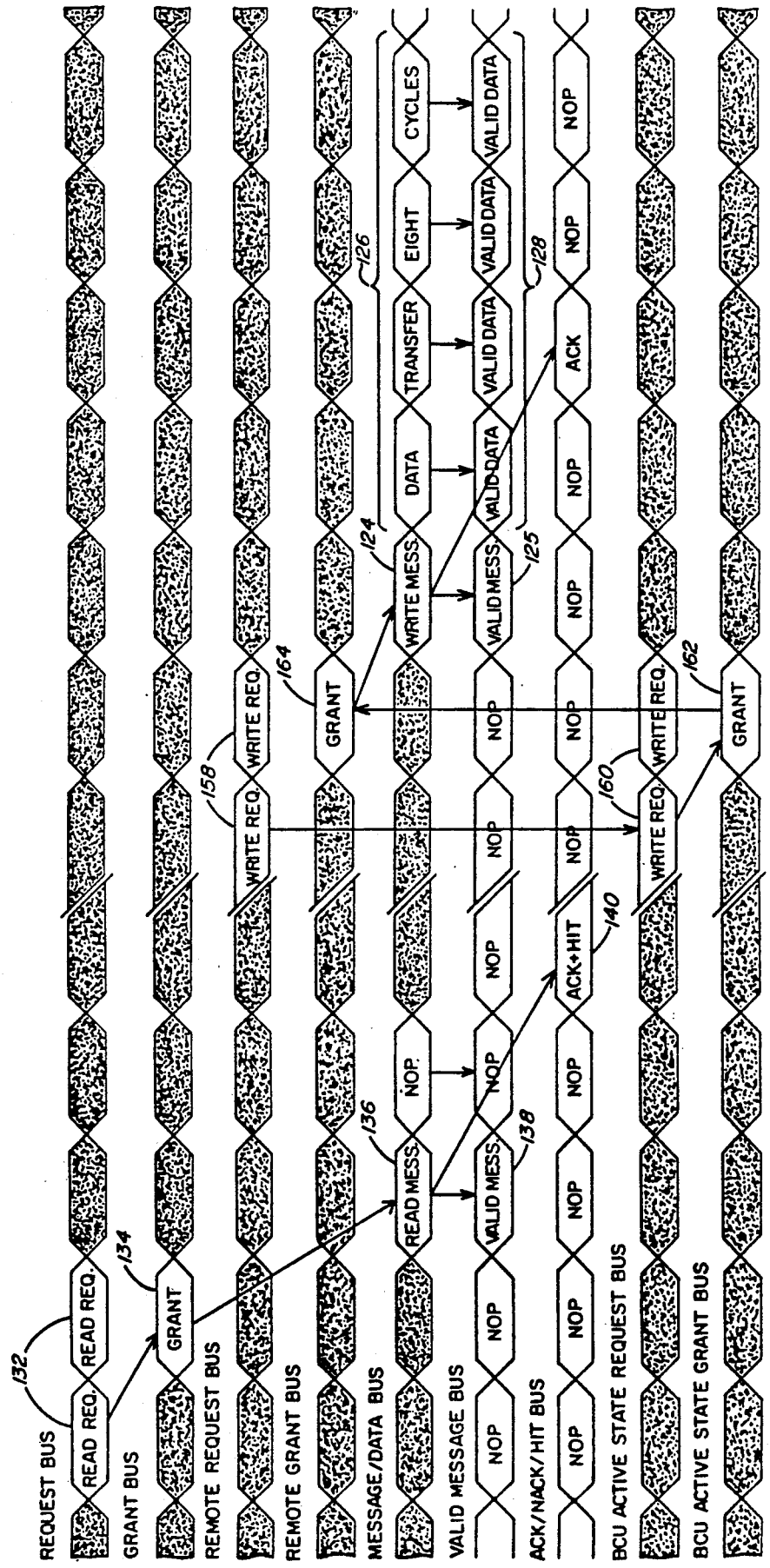

SYSTEM BUS FOR MULTIPROCESSOR COMPUTER SYSTEM

CROSS REFERENCE TO RELATED APPLICATION

This application is a continuation of application Ser. No. 07/397,124, filed Aug. 22, 1989 now abandoned.

FIELD OF THE INVENTION

The invention relates to multiprocessor systems with small size, high-speed data caches to supplement main memory. More particularly, the invention relates to the system bus structure and protocol between various devices in the system for transferring data blocks and maintaining cache consistency.

BACKGROUND OF THE INVENTION

Typically, in multiprocessor systems, the processing units, main memory, peripheral devices and other devices are all tied together by a multidrop system bus which carries messages, instructions, data, addresses, protocol signals, etc. to and from all devices. In multiprocessor systems having large memory capacity, the main memory is constructed of inexpensive, slow memory components. Each access to main memory to obtain data requires use of the data and address portions of the system bus and a substantial amount of memory access time thus seriously inhibiting the performance of the computer system. It is found that, in computer systems having large main memory capacity, a substantial portion of the memory is used very infrequently. On the other hand, certain data blocks (i.e. memory locations) are used very frequently by the processing units (or processors). Because of this characteristic, many large memory capacity computer systems employ small volume, high-speed memory buffers or caches for storing copies of the frequently used data locally to the processing units. By placing the frequently used data in a faster, local memory cache, processing time and use of the system bus can be significantly reduced. When a processing unit needs to read data from an address, it accesses the high speed data cache. If the requested data address is not in the data cache, only then is an access to slower main memory over the system bus executed. To make the addition of a cache memory efficient, the access time of the cache memory should be about five to fifteen times faster than the access time of the main memory.

It is further found that the most recently accessed data is more likely to be accessed again by the processing units than data which has not been accessed recently.

The data cache is inserted between the processing unit and the system bus which couples between processing units, the main memory and all other devices on the system. Typically, some form of virtual addressing is used to address the space in the data cache. Tag bits are normally appended to the data in the cache in order to identify the actual physical address of the data in the cache. Various types of mapping functions are known in the prior art for addressing memory in the data cache and determining if it corresponds to the main memory location desired by the processing unit. The tag bits (or tags) are compared to some of the higher order bits of the requested address. If the tags indicate that the data is the desired data, the processing unit simply reads the data out of the cache. If, however, the tags do not match, then memory control hardware in the cache obtains the data from the main memory and replaces a location in the cache with the newly obtained data. The method of selecting the data which is to be replaced in the cache is called a replacement algorithm.

Normally, the processing unit simply issues normal read and write instructions using physical main memory addresses and the processing unit need not even know that a data cache is being used. Control circuitry in the cache determines if the requested data is in the cache.

The operation of the data cache during a read instruction from the processing unit is straightforward. If the requested data is in the cache, it is forwarded directly to the processing unit. If, however, the data is not in the cache, the cache obtains the data from main memory, stores it in the cache and also forwards it to the processing unit. In the case of a write to memory, there are various possible implementations. In one possible method, data can be written to the cache and the main memory simultaneously. However, a substantial amount of processor time is saved by only writing to the cache memory during the write operation and providing a flag for the location in the cache which indicates that the data in that location has been updated and is no longer consistent with the data in main memory. The main memory, then, can be updated only when this block of memory is to be removed from the cache to make way for a new block. This method saves unnecessary write operations to the main memory when a given cache word is updated a number of times before it is replaced in the cache.

Today there are numerous multiprocessor systems, i.e. computer systems having multiple processing units, available on the market. In multiprocessor systems using memory caches, each processor may have its own dedicated memory cache or they may all share a single memory cache. The use of data caches in these systems is more complex than that previously described due to the need to service multiple processors, and, if each processor has its own data cache, maintain consistency of data between multiple caches. Even further, some manufacturers now produce computer systems having two levels of cache memory: a small, very fast primary cache and a larger and frequently slightly slower secondary cache.

As the number of caches and/or the number of processors in a system increases, the memory access method and apparatus and the system bus protocol becomes extremely complicated. Some of the problems which must be addressed in designing the system bus and the associated protocol include; (1) providing means for maintaining consistency between the various caches, levels of caches and main memory, (2) providing an adequate mapping function, (3) developing an adequate replacement algorithm, (4) keeping the cost and size reasonable and (5) minimizing use of the system bus.

Various prior art approaches to the design of system buses and system bus protocols in multiprocessor systems are discussed in J. Archibald & J. Baer, *Cache Coherence Protocols: Evaluation Using A Multiprocessor Simulation Model*, ACM Transactions on Computer Systems, Vol., 4 No. 4 (November 1986).

It is an object of the present invention to provide a multiprocessor system having multiple levels of cache memory.

It is a further object of the present invention to minimize the use of the system bus for accessing memory locations in a multiprocessor system.

It is yet another object of the present invention to provide a method and apparatus for maintaining cache consistency in a multiprocessor system having multiple levels of cache memory.

It is one more object of the present invention to provide an efficient addressing protocol in a multiprocessor system having multiple levels of cache data storage.

It is yet another object of the present invention to provide decentralized cache consistency control so as to avoid catastrophic failure in the event of a failure at a single point.

It is another object of the present invention to provide a cache consistency scheme in which errors can be detected before the entire system is corrupted.

It is one more object of the present invention to provide a multiprocessor system with multiple data buffers wherein data may be read from a buffer and invalidated with a single instruction.

It is yet another object of the present invention to provide a novel system bus protocol scheme for a multiprocessor system having a plurality of memory caches.

It is a further object of the present invention to provide an improved system bus structure and method for a multiprocessor system.

SUMMARY OF THE INVENTION

The invention comprises a system bus method and apparatus for a multi-arm multiprocessor computer system having main memory and localized buffer cache memories for each processor. A buffer memory controller at each cache services cache misses, and maintains cache consistency between the separate data caches in the multiprocessor system. For each data location in a cache, the actual data from a main memory location is stored along with data tags which contain part of the main memory address from which the data comes, and the condition of the data in the cache in terms of its relation to the corresponding data in the main memory as well as other caches. Communication is carried out between the main memory and the multiple processors over a single system bus comprising three subparts; 1) a MESSAGE/DATA bus, 2) a REQUEST/GRANT bus, and 3) a BCU bus.

A bus control unit (BCU) is provided on each arm for controlling and granting access to the bus to the various processors and other devices on the system arm.

In order to minimize use of the system bus, the system protocol allows, under the appropriate circumstances, data in the caches to be altered by processor operations without updating the corresponding data locations in main memory and/or other caches. When a data location in a cache is updated by the associated processing unit, the tags associated with that data are also updated to indicate the state of the data in that particular cache with respect to the other caches and main memory. The updating device may also send instructions over the system bus instructing other caches to update their tag bits. Further, under the appropriate circumstances, a copy of the most recent data block may be transferred from one cache to another (with appropriate updating of tags) without updating the main memory. Inconsistent copies of data, therefore, are allowed to exist in difference caches until conditions prevail that might cause stale data to be used. At that point, the device with the most recent copy of the data accesses the system bus and updates the main memory.

The MESSAGE/DATA bus is a bi-directional, multidrop bus coupled to every device on the system and is used for transferring messages (e.g. instructions), data and addresses in the system. The REQUEST/GRANT bus couples between every device on a given arm and that arm's BCU. It comprises four unidirectional, single drop request lines coupled from each device to the local BCU which are used for requesting access to the bus with different requests of varying priority. The REQUEST/GRANT bus further comprises one unidirectional single drop grant line per device on an arm. Each grant line couples from the local BCU to a device on the arm. The BCU observes all REQUEST lines and sends out a grant signal to the device having the highest priority REQUEST for access to the MESSAGE/DATA bus.

The BCU bus couples between all BCUs on the system and comprises five BCU REQUEST lines and two BCU GRANT lines between each BCU and every other BCU on the system. The BCU bus is used for transferring control of the system bus amongst the BCUs. Each BCU observes the REQUEST signals on the REQUEST/GRANT bus of its arm and, if it does not already have control of the bus, places the highest priority request on the BCU REQUEST lines. The currently active BCU will observe the BCU REQUEST lines and the local REQUEST lines on its arm's REQUEST/GRANT bus and grant control of the bus to the BCU having the highest priority request. That BCU can then grant bus access to the device on its arm having the highest priority request on the REQUEST/GRANT bus. Both the MESSAGE/DATA bus and the BCU bus comprise additional bits, termed the ACK/NACK/HIT bits. These bits are used to respond to instructions on the MESSAGE/DATA bus to inform the instruction-issuing device whether all devices can respond to the instruction properly and to tell the instruction-issuing device the condition of the data in each cache of the multiprocessor system in relation to the other caches and main memory. Thus, the protocol of the present invention can maintain cache consistency, reduce the number the number of accesses to main memory and reduce system bus use in a multiprocessor system.

The invention will be better understood when the following detailed description of a preferred embodiment is read in conjunction with the drawing.

BRIEF DESCRIPTION OF THE DRAWING

FIGS. 4A, 4B and 4C are tables showing a breakdown of the data and tag bits contained in a memory location of a secondary cache of the present invention;

FIG. 5 is a table of possible states of data in the data caches of a processor.

FIG. 7 is a table showing a breakdown of the various portions of the system bus.

FIG. 8 is a table showing the possible states of the ACK/NACK/HIT-IN lines of the system bus.

FIG. 9 shows a table of the possible states of the ACK/NACK/HIT-OUT-lines of the system bus.

FIG. 10 shows a table of bus REQUEST messages of the present invention including a description of the conditions under which a device will issue the various REQUESTS.

FIG. 11 shows a table of the protocol rules for use of the system bus of the present invention.

FIG. 16 is a timing diagram showing information transfer on various portions of the system bus in response to a READ request in which the cache hit is on a remote arm.

DETAILED DESCRIPTION OF A PREFERRED EMBODIMENT OF THE INVENTION

General Description of Multiprocessor System

Figure 1:
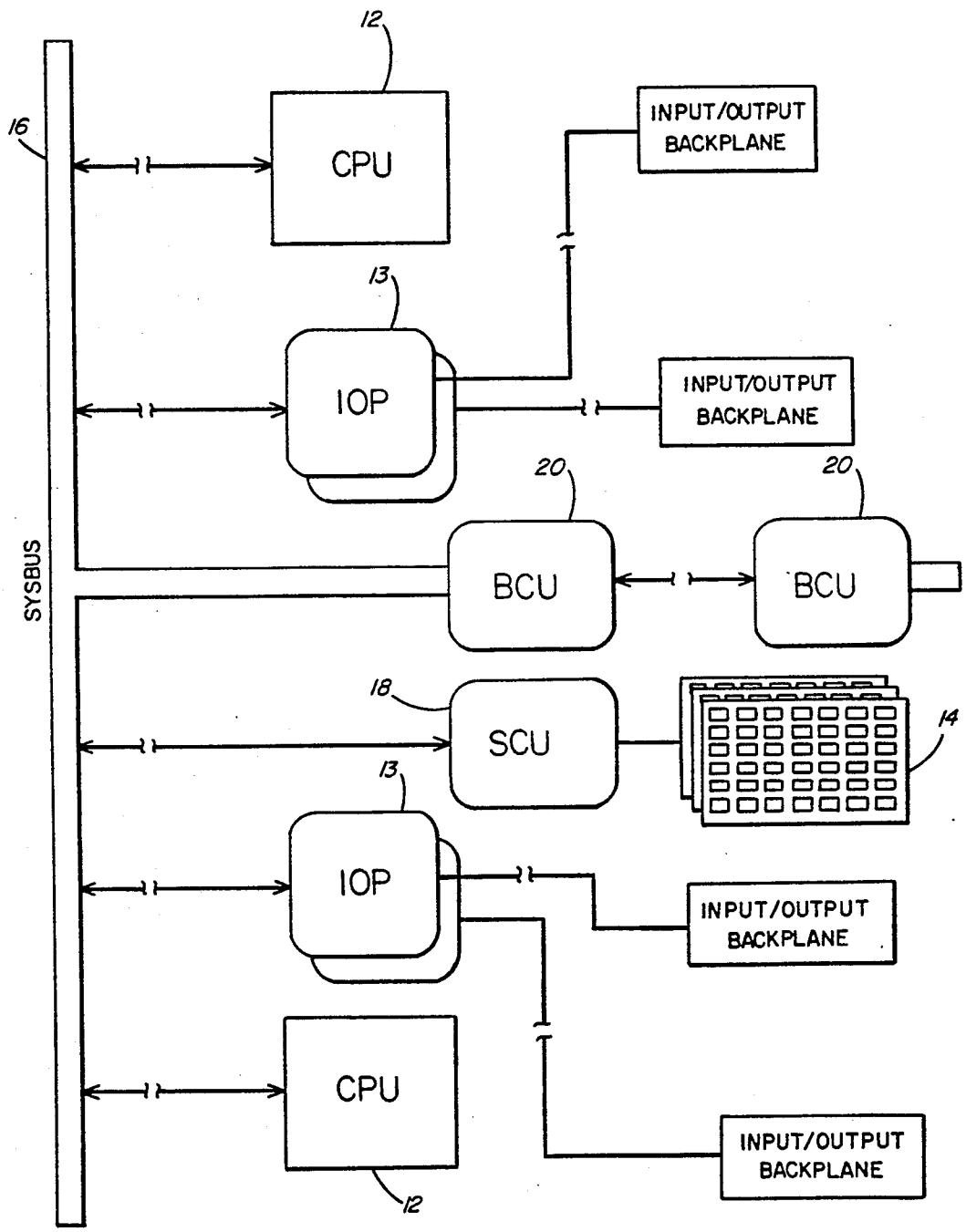
FIG. 1 is a block diagram of a multiprocessor system.

FIG. 1 shows a general block diagram of a multiprocessor system in which the present invention can be incorporated. The system comprises processing units (or processors) 12, input/output processors 13 (IOPs) and a main memory 14. A system bus (SYSBUS) 16 provides the communication path between the processing units, IOPs and main memory. The main memory 14 is coupled to the system bus 16 through a storage control unit (SCU) 18 which controls the interfacing of the main memory 14 with the system bus 16. Further, a bus control unit (BCU) 20 organizes and controls processor access to the system bus according to a predetermined hierarchy of bus access requests and interrupts.

Figure 2:
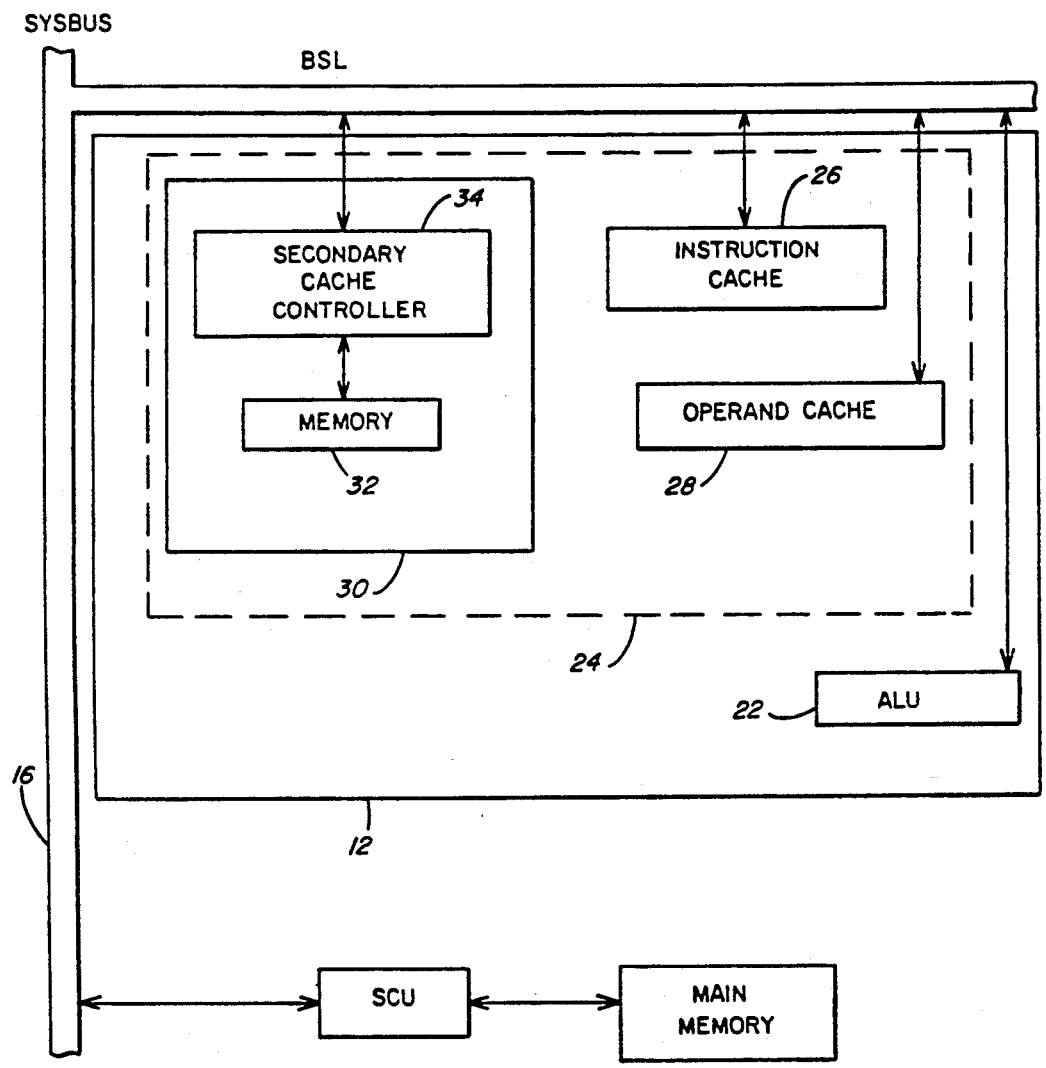
FIG. 2 is a more detailed block diagram of the multiprocessor system of FIG. 1.

FIG. 2 shows a more detailed diagram of a processing unit as it is coupled to the system bus and main memory. FIG. 2 shows that each processing unit 12 comprises processing hardware (generally denoted as the ALU 22) and a buffer or cache memory section 24. The buffer memory section 24 contains two levels of buffer memory, a primary level comprising an instruction cache 26 and an operand cache 28, as well as a secondary level comprising a secondary cache 30. Further, the secondary cache 30 comprises a memory storage area 32 and a secondary cache controller 34 which regulates the functions of the secondary cache. The secondary cache controller 34 services primary cache misses, sends instructions over the SYSBUS to obtain data when there is a secondary cache miss, and responds to instructions received from other devices over the SYSBUS while maintaining data indicating cache consistency.

Data caches

Figure 3:
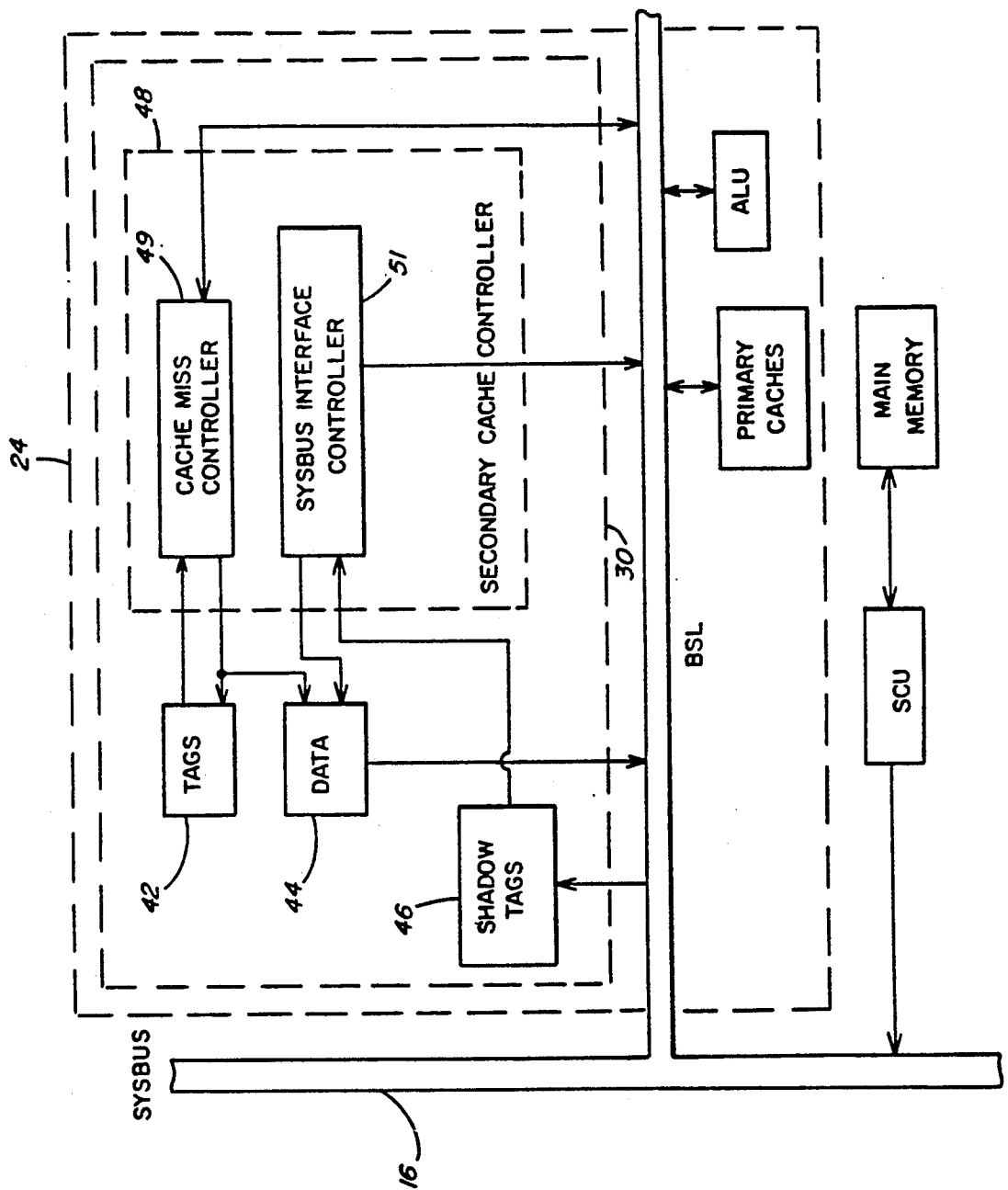
FIG. 3 is a block diagram of the internal structure of a secondary cache of the present invention.

FIG. 3 shows a block diagram of the internal structure of the secondary cache 30. The memory of the secondary cache is broken down into two main sections: the tag section 42 and the data section 44. A single address accesses both the tag and the data portions of a memory location. The secondary cache further comprises a memory section 46 containing shadow tags. When the secondary cache 30 receives a request for data over the SYSBUS 16, the shadow tag section 44 is used as a quick reference to determine if the local cache has a copy of the data and, if so, the condition of the data in relation to other caches in the multiprocessor system. A secondary cache controller 48 comprises hardware for servicing requests from the primary caches (cache misses) as well as responding to SYSBUS instructions while maintaining cache consistency. The secondary cache controller 48 affords higher priority to servicing of instructions received over the SYSBUS from other caches or the SCU than to primary cache misses. The secondary cache controller 48 comprises two sections, a SYSBUS interface controller 51 and a cache miss controller 49. Section 51 monitors the SYSBUS at all times and handles SYSBUS activities. In response to the SYSBUS activities, SYSBUS interface controller 51 updates the shadow tag section 46 in order to maintain cache consistency among processors. Cache miss controller section 49 contains the logic for detecting and servicing secondary cache misses. When a primary cache experiences a cache miss, it issues a signal which informs the secondary cache controller of the type of miss which occurred and the physical address of the missed data. Cache miss controller 49 determines if the address is present in the secondary cache and, if so, writes the data to the primary cache and updates its tag bits to indicate the new condition of the primary caches. If the data is not present in the secondary cache or is in the secondary cache and is in a condition which might lead to inconsistent copies of data if written back to the primary cache, then it requests access to the bus and initiates the appropriate SYSBUS instruction to service the primary cache miss.

Communication between the secondary cache and the primary cache as well as the SYSBUS and the secondary cache is carried out over the BSL bus. The BSL is a 72-bit bi-directional bus in each processor that connects the secondary cache, the two primary caches, and the SYSBUS. As well as carrying multiplexed address data and messages, the BSL also detects parity errors on byte boundaries. The BSL comprises several lines dedicated to the transmission of instructions for servicing SYSBUS requests and primary cache misses. Essentially, the BSL bus is used to perform the following functions: (1) pass physical and virtual addresses from a primary cache to the secondary cache in order to service a primary cache miss; (2) writeback a modified operand to the secondary cache if the modified block is being replaced in the operand cache; (3) transfer data from the secondary cache to the primary caches, (4) invalidate entries in the primary caches, (5) transfer data from the SYSBUS to the secondary cache and the primary caches, (6) pass messages from the processing unit to the secondary cache and then on to the SYSBUS, (7) pass instructions from the secondary cache controller to the SYSBUS, and (8) transfer data from the secondary cache to the SYSBUS for serving remote cache misses, or writing back modified data to the main memory when a cache swap is required.

When the secondary cache controller has determined the nature of a request or instruction, it decides on the action to be taken and issues instructions to the other devices in the associated buffer. Instructions from the SYSBUS have a higher priority for service from the secondary cache controller than requests from the secondary or primary caches. If a secondary cache controller receives an instruction over the SYSBUS while servicing a primary cache miss, the primary cache miss service is interrupted and put on hold until the SYSBUS instruction is serviced. Further, requests from the operand cache are serviced before requests from the instruction cache.

Both the instruction cache and the operand cache are virtually addressed and are two-way set associative. The secondary cache is also two-way set associative but is physically addressed.

When the ALU 22 desires to read from or write to an address, it provides a virtual address to the primary caches and to a translation lookaside buffer including a series of tag bits in order to allow reconstruction of the physical address if the data is not in one of the primary caches. In the ALU, each line of code comprises two fields, an instruction field and an operand field: The ALU accesses the operand cache when fetching operand data and accesses the instruction cache when fetching instruction data. If the data is present in the instruction cache or operand cache, the data is simply returned to the ALU 22 and processing continues normally. However, if there is a cache miss, i.e. the data is not present in one of the primary caches, then a primary cache miss occurs. In this case, the contents of the translation lookaside buffer are used to reconstruct the physical address which is then forwarded to the secondary cache controller. If the secondary cache controller determines that the desired data is in the secondary cache, it services the request from the primary cache by sending the data to the appropriate memory location in that primary cache. A data location in the primary cache is replaced with the data according to a predetermined replacement algorithm. The data is then forwarded to the ALU. If, however, the data is not present in the secondary cache, then a secondary cache miss occurs. The secondary cache controller will then output a signal on the SYSBUS requesting the data in the specified address and wait for the data from main memory or possibly from another secondary cache.

The primary caches in the system are constructed of very fast memory components such that the execution of a large portion of the instructions from the processors can be executed very quickly. The secondary caches are also constructed of very fast memory components, albeit slower than the primary caches. Only in the event of a secondary cache requiring an access to main memory to obtain the requested data, is it necessary to access the low cost, slow speed main memory.

Cache Operation

As stated, when both primary cache misses occur, the requested data is obtained either from one of the secondary caches or from main memory and is placed in the primary cache as well as the associated secondary cache. If there is space in both the primary and secondary caches for the new data, this is the only operation necessary. However, if both of the two locations to which the data can be written in the two-way set associative cache memories are occupied by valid data from other main memory locations, one of those blocks of data must be deleted from the caches. The replacement algorithm is used to choose which block is to be replaced. If the tags associated with the block of data which is being replaced indicate that the data has been modified since the last time it was written back to main memory, then the data must be written back to main memory at this point in order to preserve a valid copy of it. The secondary cache controller controls this operation as will be described in greater detail herein.

Data in the primary caches may be in one of three different "states" relative to the corresponding data in the secondary cache or the other primary cache. First, the data in the primary cache may simply be invalid. Secondly, the data may be valid and shared (hereinafter "shared"). The shared condition means that the data from the requested address is contained in the primary cache and that the associated secondary cache (i.e., the secondary cache in the same memory buffer 12), and possibly the other primary cache, contains an identical copy of the data therein and also has it tagged as "shared". It is possible for a data block to be in both the instruction and operand caches simultaneously since a data block commonly comprises several smaller independent units of data which may include both instructions and operands.

The method of the present invention, as will be described in greater detail herein, does not allow a copy of data from a main memory location to exist in a primary cache without it also existing in the associated secondary cache. However, data which constitute operands can be altered by the processing units. Therefore, data in the operand cache may be in a third state, the modified state, in which both the operand cache and the associated secondary cache contain a copy of the data in the requested main memory location, but the data is inconsistent. This condition can exist since a processor can write to a block of data in the primary cache and, unless the data is also written to the secondary cache, the secondary cache contains what is essentially a stale piece of data.

Data which is present in the instruction cache may also be modified by the processor, but the system protocol does not allow data in the instruction cache to be tagged as modified. Therefore, data blocks which exist in an instruction cache and become modified through an operation involving the operand cache are invalidated in the instruction cache. Data which is present in the instruction cache may be modified in one of two ways. First, as noted above, a data block may contain both instruction and operand data and therefore exist in both an operand cache and an instruction cache. Therefore, the operand portion of a data block which also contains an instruction portion may be modified. Secondly, the multiprocessor system may allow for self-modifying code in which actual instruction data can be modified. Note, however, that in both of these situations, the data block is updated in the operand cache. This type of modification of a data block in an operand cache will necessitate the marking of the data as invalid in an instruction cache containing the same block. When the same block of data is accessed from the instruction cache, it will be found to be invalid and a cache miss will occur. Therefore, even though instruction data blocks actually can be modified, they are never marked as modified in the instruction cache.

Although not a "state" as the term is used above, it is also possible that a requested data block may be in a fourth condition, i.e., it simply may not be in the buffer and must be fetched from main memory (or possibly another secondary cache).

Data in the secondary cache may be in one of four possible states relative to other secondary caches; (1) invalid, (2) shared, (3) private, or (4) modified. A block of data in the secondary cache is invalid only if it was intentionally made so in response to one of several possible conditions. A shared block contains data which is consistent with main memory and may, but does not necessarily, exist in another secondary cache of the multiprocessor system. A private data block means that the data exists only in that one secondary cache (and possibly also in one of its associated primary caches) and is consistent with main memory. Finally, a modified cache block means that it exists in only one secondary cache and possibly the associated operand cache and that it has previously been modified such that the data in the secondary cache and/or operand cache will be inconsistent with the corresponding main memory location.

By allowing inconsistent copies of data to exist in the buffer caches and tagging the data so that its state in relation to other copies thereof can be determined, use of the SYSBUS for servicing cache misses can be minimized.

Under normal operation, each processor accesses one of its primary caches with a virtual address (and tag bits) when it needs to access a data location. If the data is not present in the primary caches, logic circuitry in the primary cache reconstructs the physical address and attempts to obtain the data from the associated secondary cache. If the data also is not present in the secondary cache, then the secondary cache controller requests access to the SYSBUS. When access is granted, it sends an instruction over the SYSBUS to main memory as well as the secondary cache controllers of all other processors indicating that it desires to read or write to the indicated address. As will be discussed in greater detail, the instruction may be either a simple READ or a READ AND INVALIDATE request which instructs the other cache controllers to mark the data as invalid in the associated secondary cache and primary caches after the requesting device reads the data. The responding device (cache controller or SCU) will return the data over the SYSBUS via one of several types of write instructions. Under the appropriate circumstances, a secondary controller might also send out an INVALIDATE instruction to the other secondary cache controllers instructing them to simply mark a particular data block as invalid.

At the primary cache level, there are six types of cache misses which can occur. An Instruction Cache Miss occurs when the contents of the virtual address that the processor is fetching is not present in the instruction cache but space is available in which to place the data when it is eventually obtained. An Instruction Cache Miss with Replacement occurs when the contents of the virtual address which the processor is fetching is not present in the instruction cache and both data blocks into which the data can be placed in the two way set associative instruction cache contain valid data from other main memory locations. Under these conditions, one of the data blocks is thrown out of the instruction cache and replaced with the data that is currently being fetched.

Since data in the operand cache can be altered (modified) by the processors, there ar four types of operand cache misses. An Operand Cache Short Miss occurs when the processor writes to a block of operand data that is present in the operand cache but is marked as shared. Although there is no need to obtain the data from elsewhere since it is already in the cache, the block cannot be written to without first obtaining the right to do so. Data which is marked as shared in the operand cache, by definition, is also marked as shared elsewhere (i.e., the associated instruction cache or secondary cache). Therefore, the operand cache must obtain the right to modify the data from the other caches with which it shares the data or these other caches will have a stale copy of the data which is marked as valid (i.e., shared). Therefore, this situation is not a true cache miss and is termed a short miss.

An Operand Cache Simple Long Miss occurs when a block of operand data is fetched that is not in the operand cache, but there is space available in which to put it without the need to overwrite other valid data. An Operand Cache Long Miss with Replacement occurs when a block of operand data that is not in the operand cache is fetched by the processor, but both memory locations in the two-way set associative operand cache which can accept the data already contain valid data from other memory locations, and the block that is to be replaced has not been modified. Finally, an Operand Cache Long Miss with Writeback occurs when a block of operand data is fetched that is not in the operand cache, both locations to which the data can be written contain valid data from other memory locations, and the block that is to be replaced has been modified. Under these conditions, the modified block of data must be written back to the main memory before being replaced so as not to lose the only valid copy of the data.

If the data is in the secondary cache in either the private or modified state, then the primary cache miss can be serviced solely by the secondary cache without any need to access the SYSBUS. However, if the data is either not in the secondary cache or exists in the secondary cache but is marked invalid or shared, one of four different types of secondary cache misses can occur. The secondary cache misses are termed derivative events since they occur in response to primary cache misses.

A Secondary Cache Short Miss occurs under the following conditions:

(1) there is an Operand Cache Long Miss or an Operand Cache Short Miss, (2) the miss occurs during a processor write cycle, (3) the data is in the secondary cache, (4) the data is marked as shared.

A Secondary Cache Simple Long Miss occurs under the following conditions:

(1) there is a long miss in a primary cache, with or without replacement, (2) the data is not in the secondary cache, (3) there is an invalid block of data in the secondary cache into which the fetched block of data can be placed.

A Secondary Cache Long Miss with Replacement occurs under the following conditions:

(1) there is a long miss in a primary cache, with or without replacement, (2) the data is not in the secondary cache, (3) a block of data must be removed from the secondary cache in order to make room for the requested block of data, and the block which is to be removed has not been modified and therefore need not be written back to main memory.

A Secondary Cache Long Miss with Writeback occurs under the following conditions:

(1) there is a long miss in a primary cache, with or without replacement, (2) the data is not in the secondary cache, (3) a block must be removed from the secondary cache in order to make room for the requested block of data, and the block which must be removed has been modified and therefore must be written back to main memory to preserve a copy of the data.

SYSBUS events constitute a third level of events which can occur in response to Cache Misses. When a Secondary Cache Miss occurs, the associated secondary cache controller will request access to the SYSBUS to issue a SYSBUS Instruction. At the SYSBUS level, there are three instructions which a secondary cache controller will issue when servicing a cache miss. The instructions are sent out on the SYSBUS and are received by all other secondary caches and the SCU of the main memory. The three SYSBUS instructions mentioned above are (1) INVALIDATE, (2) READ, and (3) READ AND INVALIDATE.

An INVALIDATE instruction is issued by a secondary cache controller when a data block is marked in its secondary cache as shared and it wishes to modify the contents, e.g. write to the block. An instruction to INVALIDATE a block should never be received by a secondary cache containing a modified version of the block since this would erase the only valid copy of the data block.

An instruction to READ a block of data is issued when a secondary cache does not contain a copy of a block which the associated processing unit wishes to read. If an instruction to READ a block is received by a secondary cache controller, any modified versions of the block must be written back to main memory and a copy of the block must be sent to the requesting controller. The block remains in the cache, but the tags associated with that block must be modified to indicate that the data is now shared.

An instruction to READ AND INVALIDATE a block is issued when a device wishes to write to that block but the associated primary and secondary caches do not contain a copy of that block. When this instruction is received over the SYSBUS by a secondary cache controller, if the data is marked as shared, private, or modified the block must be removed from all of the caches in the responding device or devices (i.e., the tags must be updated to invalid).

Another device, either the SCU or a secondary cache controller, will respond to a READ or READ AND INVALIDATE instruction by writing the requested data block to the secondary cache controller which issued the READ or READ AND INVALIDATE instruction. As will be discussed shortly, the responding device may return the data to the requesting secondary cache controller with a simple WRITE instruction or possibly the more complex WRITE AND WRITE BACK instruction. With either instruction, however, the WRITE instruction will include a portion notifying the cache to which it is writing, the condition of the data which is being written as it should be tagqed in the receiving cache's tags (i.e., shared, private, or modified).

The data tags associated with each block of data in the secondary caches contain the information needed by the secondary cache controllers to make the system operate. FIG. 4 shows a breakdown of the data and tag portions of a block of data in a secondary cache. The data portion of each block is shown in FIG. 4A and comprises 64 bytes of data. Since the secondary cache is two way set associative, the tag portion of each set in the secondary cache comprises data pertaining to two blocks of data. Associated with each set in the secondary cache is 72 bits of tag data arranged as shown in FIG. 4B. Each index field 50 comprises the fifteen high order bits of the physical address of the associated data block in the secondary cache data section 44. The logic in the secondary cache controller compares the index field 50 against the physical page number of the requested address.

The IV field 52 comprises a single bit which is set to one when the corresponding entry in the instruction cache contains valid data. The OV field 54 contains a single bit which is set to one when the corresponding entry in the operand cache contains valid data. The OS field 56 is a single bit field showing which set of the two-way set associative operand cache contains the data block. The contents of the OS field are relevant only when the OV field indicates that the data is valid. The IS field 58 is also a single bit field which shows which set of the two-way set associative instruction cache contains the data block. The contents of the IS field are relevant only when the IV fields indicate that the data is valid.

The leaf field 60 comprises six bits which contain the six LSBs of the virtual page number of the data block. These are bits 11 through 16 of the virtual address. The secondary cache uses the Leaf bits, the physical address, and the OS and IS bits to construct the virtual address that it uses when it communicates with the operand and instruction caches.

The one bit MO field 62 indicates whether the operand cache has modified the data. The data block in the operand cache differs from the data block in the secondary cache when the MO field bit is set. The STAMP field 64 is a two-bit field containing a time stamp that records how often a data block is accessed. The time stamp is used to determine which set should be swapped out when one data block in that two-way set must be replaced by another. The STAMP field 64 is updated at the time when serving a primary cache miss; it is not updated when the secondary cache experiences a secondary cache miss.

When set, the one-bit B field 66 indicates that the related block of cache RAM is broken. If only one broken bit is set, then it works as a one-way associative cache. If both broken bits are set, then the processing unit is down. The P field 68 is a single bit parity field.

The OWN field 70 comprises two bits which indicate the status of the data block in the secondary cache as shown below:

00—shared
01—private
10—invalid
11—modified

The shadow tag section 72 essentially contains redundant data to that which is contained in the tag section 42. The shadow tag section 72 is included to provide a quick and easy way for each secondary cache controller to respond to SYSBUS instructions. When the secondary cache receives a request for data through the SYSBUS, the secondary cache controller 48 uses the shadow tags as a quick reference to determine if the local cache contains the data. The format of the shadow tag section 46 is shown in FIG. 4C. As above, the OWN fields 74 indicate the status of the data block, i.e. shared, private, invalid or modified. The index fields 76 in the shadow tag section 46 comprise seventeen bits rather than fifteen bits. This field comprises the fifteen high order bits of the physical address that is associated with the data block in the secondary cache data section 44 and two parity bits. The secondary cache controller 48 compares the index fields against the page number of the requested data from the SYSBUS.

The primary caches also contain tags which indicate the condition of the data in the primary caches. The instruction cache has a condition bit which is set to zero if the data is invalid in the instruction cache and is set to one if the data is shared. The operand cache has a similar condition bit as well as a second condition bit which indicates whether the data has been modified or not. If the second condition bit is set to zero, the data is shared. Alternately, if it is set to one, the data is modified.

The following discussion outlines the operation of the two level cache system of the present invention. It further describes how keeping track of the condition of the data blocks as they relate to other copies of the data in the system is used to minimize SYSBUS events and increase the overall efficiency of the multiprocessor system. It also describes how and why SYSBUS events affect the validity of data in cache systems other than the one which initiated the SYSBUS event. The discussion is broken down into three segments. The first segment describes the operations performed as a result of cache misses at the primary level of caches. This segment includes before and after results on the tagging of the data in the associated caches (i.e., shared, modified, private, or invalid). The second segment describes the derivative (or secondary cache) events which occur in response to the various types of Primary Cache Misses.

Finally, the third segment describes the responses of the secondary cache controllers and the effect on the data in the caches in response to third level instructions received over the SYSBUS. Primary and secondary level events in one processor do not, in and of themselves, affect the bi-level caches associated with other processors on the multiprocessor system. However, the SYSBUS events which occur in response to the primary and secondary events do affect the other bi-level caches in the multiprocessor system. Therefore, data blocks in each bi-level cache can be updated, modified, invalidated, etc., not only in response to primary level events, but also in response to SYSBUS events initiated in other processors in the system. These SYSBUS events are the subject of the third section of the following discussion.

The first section of the discussion describes how cache misses are serviced at the primary level. The details of how an action, such as updating the operand cache or invalidating the instruction cache are performed, are not discussed in the first section but rather in the subsequent sections.

FIG. 5 shows the fourteen possible combinations of data status in the three caches of a single processor cache. Although there are more permutations of possible combinations of the Instruction cache, Operand cache and Secondary cache, it should become apparent shortly that only the fourteen combinations listed in FIG. 5 are possible. For instance, if the data in the secondary cache is marked as invalid, then it is impossible for the data in either of the primary caches to be anything but also invalid since the system does not allow data to exist in the primary caches without it also existing in the associated secondary cache. It is also impossible for the data in the Operand cache to be marked as modified except when the secondary cache is also marked as modified.

PRIMARY LEVEL EVENTS

I Primary Level Event: Instruction Cache Miss

A. Block in State 1

The state of the block before the event:
Instruction Cache: Invalid
Operand Cache: Invalid
Secondary Cache: Invalid
The state of the block after the event has been serviced:
Instruction Cache: Shared
Operand Cache: Invalid
Secondary Cache: Shared or Private
Since a block in this state is not valid in the Secondary cache, the request from the Instruction cache will cause a Secondary Cache Long Miss. The Instruction cache will be updated in parallel with the Secondary cache when data is returned over the SYSBUS to service the Secondary cache miss. The value of the operation field of the SYSBUS message that serviced the Secondary Cache Long Miss will determine if the block is marked as shared or private in the Secondary cache.

B. Block in States 3, 5, 7, 9, 11, or 13

The state of the block before the event:
Instruction Cache: Shared
Operand Cache: Don't Care
Secondary Cache: Don't Care
If the block is in any of these states an Instruction Cache Miss should not have occurred because the block was already valid within the Instruction cache. Therefore this is an error condition.

Secondary cache controller section 52 will detect this condition, freeze the associated processor, halt the SYSBUS and issue an error interrupt.

C. Block in States 2, 4, 6, or 8

The state of the block before the event:
Instruction Cache: Invalid
Operand Cache: Don't Care
Secondary Cache: Shared or Private
The state of the block after the event has been serviced:
Instruction Cache: Shared
Operand Cache: Unchanged
Secondary Cache: Unchanged
The Secondary cache contains a current copy of the block since it is marked Shared or Private. The Instruction cache is updated from this copy by the Secondary cache.

D. Block in States 10, 12

The state of the block before the event:
Instruction Cache: Invalid
Operand Cache: Invalid or Shared
Secondary Cache: Modified
The state of the block after the event has been serviced:
Instruction Cache: Shared
Operand Cache: Unchanged
Secondary Cache: Modified
The block is marked as modified in the Secondary cache but not in the Operand cache. Therefore the Secondary cache has the current copy of the block. The Instruction cache is updated from this copy by the Secondary cache.

E. Block in State 14

The state of the block before the event:
Instruction Cache: Invalid
Operand Cache: Modified
Secondary Cache: Modified
The state of the block after the event has been serviced:
Instruction Cache: Shared
Operand Cache: Shared
Secondary Cache: Modified Since the block is marked as modified in both the Operand cache and the Secondary cache, the current copy of the block is found in the Operand cache. The copy of the block in the Operand cache is written back to the Secondary cache and placed into the Instruction cache at the same time. The appropriate operation is initiated by the Secondary cache controller whenever a block must be written back from or invalidated in the Operand cache.

II Primary Event: Instruction Cache Miss with Replacement

This event is handled in a manner similar to the handling of an Instruction Cache Miss. The only distinction is that a second physical address, that of the block being replaced, is passed to the Secondary cache so that it can keep its copy of the state of the cache system current.

III Primary Event: Operand Cache Short Miss

A. Block in State 1

The state of the block before the event:
Instruction Cache: Invalid
Operand Cache: Invalid
Secondary Cache: Invalid
The state of the block after the event has been serviced:
Instruction Cache: Invalid
Operand Cache: Invalid
Secondary Cache: Invalid As stated above, an operand cache short miss can only occur when the data is marked as shared in the operand cache. However, also as mentioned above, SYSBUS events have priority over primary cache misses. When a SYSBUS instruction is received while a primary cache miss is being serviced, the servicing of the primary cache miss is suspended while the SYSBUS event is taken care of. Therefore, if the Operand cache takes a short miss on a block, and an instruction to invalidate the same block comes in off the SYSBUS before the short miss can be serviced, the block will be invalidated. This will leave the block in state 1.

When the Secondary cache finishes servicing the Invalidate it will find an Operand Cache Short Miss request pending. Checking the status of the block it will find it in state 1. The assumption will be made that the situation described in the preceding paragraph occurred. The Secondary cache will finish the handshaking with the Operand cache so that the processor will believe the miss has been serviced and the processor will start up. The Secondary cache will also mark the instruction for nullification. When the instruction is reissued after the nullification, the block containing its operand will be in state 1 and an Operand Cache Simple Long Miss will occur.

B. Block in States 2, 3, 6, 7, 10, 11, 14

The state of the block before the event:
Instruction Cache: Don't Care
Operand Cache: Invalid or Modified
Secondary Cache: Shared, Private or Modified This case differs from the previous case in that the block is valid in the Secondary cache. This condition of the cache implies that an INVALIDATE instruction for this block was not received after the short miss occurred but before it was serviced. Since the Operand cache should assert a short miss only if a block is marked as shared in the Operand cache, this is an error condition.

The Secondary cache controller will detect this condition as Inconsistent Cache State, freeze the processor, halt the SYSBUS, and issue an error interrupt.

C. Block in State 4

The state of the block before the event:
Instruction Cache: Invalid
Operand Cache: Shared
Secondary Cache: Shared
The state of the block after the event has been serviced:
Instruction Cache: Invalid
Operand Cache: Modified
Secondary Cache: Modified Since the block is marked as shared in the Secondary cache a Secondary Cache Short Miss occurs. Once the derivative event has been serviced, the Secondary cache will be marked as Modified. The Secondary cache can then mark the Operand cache as modified and tell the processor to continue.

D. Block in State 5

The state of the block before the event:
Instruction Cache: Shared
Operand Cache: Shared
Secondary Cache: Shared
The state of the block after the event has been serviced:
Instruction Cache: Invalid
Operand Cache: Modified
Secondary Cache: Modified The Instruction cache needs to be invalidated since it will contain a stale copy of the date once the Operand cache has modified the block. The Secondary cache invalidates the copy of the block in the Instruction cache.

Since the block is marked as shared in the Secondary cache, a Secondary Cache Short Miss occurs. Once the derivative event has been serviced, the Secondary cache will be marked as modified. The Secondary cache controller will then mark the Operand cache as modified and tell the processor to continue.

E. Block in State 8

The state of the block before the event:
Instruction Cache: Invalid
Operand Cache: Shared
Secondary Cache: Private
The state of the block after the event has been serviced:
Instruction Cache: Invalid
Operand Cache: Modified
Secondary Cache: Modified Since the data is private to this processing unit, the Secondary cache can service the request without accessing the SYSBUS. The block will be marked as modified in the Secondary cache. The Secondary cache controller will then mark the Operand cache as modified and tell the processor to continue.

F. Block in State 9

The state of the block before the event:
Instruction Cache: Shared
Operand Cache: Shared
Secondary Cache: Private
The state of the block after the event has been serviced:
Instruction Cache: Invalid
Operand Cache: Modified
Secondary Cache: Modified The Instruction cache needs to be invalidated since it will contain a stale copy of the data once the Operand cache has modified the block. The Secondary cache invalidates the copy of the block in the Instruction cache.

Since the data is private to this processing unit, the Secondary cache can service the request without accessing the SYSBUS. The block will be marked as modified in the Secondary cache. The Secondary cache controller will then mark the Operand cache as modified and tell the processor to continue.

G. Block in State 12

The state of the block before the event:
Instruction Cache: Invalid
Operand Cache: Shared
Secondary Cache: Modified
The state of the block after the event has been serviced:
Instruction Cache: Invalid
Operand Cache: Modified
Secondary Cache: Modified Since the data is marked as modified in the Secondary cache, the request can be serviced without accessing the SYSBUS or changing the state of the Secondary cache. The Secondary cache controller will simply mark the Operand cache as modified and tell the processor to continue.

H. Block in State 13

The state of the block before the event:
Instruction Cache: Shared
Operand Cache: Shared
Secondary Cache: Modified
The state of the block after the event has been serviced:
Instruction Cache: Invalid
Operand Cache: Modified
Secondary Cache: Modified The Instruction cache needs to be invalidated since it will contain a stale copy of the data once the Operand cache has modified the block. The Secondary cache controller invalidates the copy of the block in the Instruction cache.

Since the data is marked as modified in the Secondary cache the request can be serviced without accessing the SYSBUS or changing the state of the Secondary cache. The Secondary cache controller will simply mark the Operand cache as modified and tell the processor to continue.

IV Primary Event: Operand Cache Simple Long Miss

A. Block in State 1

The state of the block before the event:
Instruction Cache: Invalid
Operand Cache: Invalid
Secondary Cache: Invalid
The state of the block after the event has been serviced:
Instruction Cache: Invalid
Operand Cache: Shared or Modified
Secondary Cache: Shared or Private or Modified Since a block in this state is not valid in the Secondary cache, the request from the Operand cache will cause a Secondary Cache Long Miss. The Operand cache will be updated in parallel with the Secondary cache when data is returned over the SYSBUS to service the Secondary cache miss.

If the request occurred during a read cycle, the block will be marked as shared in the Operand cache and the block will be marked as shared or private in the Secondary cache depending on the value of the operation field of the message that services the Secondary Cache Long Miss. If the request occurred during a write cycle, the block will be marked as modified in both the Secondary cache and the Operand cache.

B. Block in State 2

The state of the block before the event:
Instruction Cache: Invalid
Operand Cache: Invalid
Secondary Cache: Shared
The state of the block after the event has been serviced:
Instruction Cache: Invalid
Operand Cache: Shared or Modified
Secondary Cache: Shared or Modified If the event occurred during a read cycle, the Operand cache will simply be updated from the copy of the block in the Secondary cache. In this case, the block will be marked as shared in both the Operand cache and the Secondary cache.

If the event occurred during a write cycle, a Secondary Cache Short Miss will occur. After the derivative event has been serviced, the block will be marked as modified in the Secondary cache. The Operand cache will then be updated from the copy in the Secondary cache. The block will be marked as modified in the Operand cache.

C. Block in State 3

The state of the block before the event:
Instruction Cache: Shared
Operand Cache: Invalid
Secondary Cache: Shared
The state of the block after the event has been serviced:
Instruction Cache: Shared or Invalid
Operand Cache: Shared or Modified
Secondary Cache: Shared or Modified If the event occurred during a read cycle, the Operand cache would be updated from the Secondary cache. The block would be marked as shared in the Instruction cache, Operand cache and the Secondary cache.

If the event occurred during a write cycle, the Instruction cache needs to be invalidated since it will contain a stale copy of the data once the Operand cache has modified the block. The Secondary cache invalidates the copy of the block in the Instruction cache. Also, a Secondary Cache Short Miss will occur because the block is marked as shared in the Secondary cache. After the derivative event has been serviced and the block has been marked as invalid in the instruction cache, the Operand cache is updated from the copy of the block in the Secondary cache. The block is marked as modified in both the Secondary cache and the Operand cache.

D. Block in States 4, 5, 8, 9, 12, 13, 14

The state of the block before the event:
Instruction Cache: Don't Care
Operand Cache: Shared or Modified
Secondary Cache: Don't Care If the block is in any of these states an Operand Cache Simple Long Miss should not have occurred because the block was already valid within the Operand cache. Therefore this is an error condition.

The Secondary cache controller will detect this condition as an Inconsistent Cache State, freeze the processor, halt the SYSBUS, and issue an error interrupt.

E. Block in State 6

The state of the block before the event:
Instruction Cache: Invalid
Operand Cache: Invalid
Secondary Cache: Private The state of the block after the event has been serviced:
Instruction Cache: Invalid
Operand Cache: Shared or Modified
Secondary Cache: Private or Modified If the event occurred during a read cycle, the Operand cache would be updated from the Secondary cache. The block would be marked as shared in the Operand cache.

If the event occurred during a write cycle, the state of the block in the Secondary cache would be changed to modified, the Operand cache would be updated from the copy of the block in the Secondary cache, and the block would be marked as modified in the Operand cache.

F. Block in State 7

The state of the block before the event:
Instruction Cache: Shared
Operand Cache: Invalid
Secondary Cache: Private The state of the block after the event has been serviced:
Instruction Cache: Invalid or Shared
Operand Cache: Shared or Modified
Secondary Cache: Private or Modified The service of an Operand Cache Simple Long Miss if the block is in state 7 is identical to the way the event is serviced if the block is in state 6 with one addition. If the event occurs during a write cycle, the copy of the block in the Instruction cache must be invalidated. This is because the copy of the data in the Instruction cache will be stale once the Operand cache modifies the block.

G. Block in State 10

The state of the block before the event:
Instruction Cache: Invalid
Operand Cache: Invalid
Secondary Cache: Modified The state of the block after the event has been serviced:
Instruction Cache: Invalid
Operand Cache: Shared or Modified
Secondary Cache: Modified The Operand cache will be updated from the copy of the block in the Secondary cache. If the event occurred during a read cycle, the block will be marked as shared in the Operand cache. If the event occurred during a write cycle, the block will be marked as modified in the Operand cache.

H. Block in State 11

The state of the block before the event:
Instruction Cache: Shared
Operand Cache: Invalid
Secondary Cache: Modified The state of the block after the event has been serviced:
Instruction Cache: Invalid or Shared
Operand Cache: Shared or Modified
Secondary Cache: Modified The service of an Operand Cache Simple Long Miss if the block is in state 11 is identical to the way the event is serviced if the block is in state 10 with one addition. If the event occurs during a write cycle, the copy of the block in the Instruction cache must be invalidated. This is because the copy of the data in the Instruction cache will be stale once the Operand cache modifies the block.

V Primary Event: Operand Cache Long Miss with Replacement

This event is handled in a manner similar to the handling of an Operand Cache Simple Long Miss. The only distinction is that a second physical address, that of the block being replaced is passed to the Secondary cache so that it can keep its copy of the state of the cache system current.

This event should occur only if the block being replaced is in state 4, 5, 8, 9, 12, or 13. If the block being replaced is in state 1, an instruction to Invalidate the block may have been received on the SYSBUS and serviced between the time the Operand Cache Long Miss with Replacement occurred and when it was serviced. For this reason, state 1 is considered a valid state to be in for the block being replaced. If the block to be replaced is in any other state (e.g. states 2, 3, 6, 7, 10, 11, 14), the Secondary cache will detect this as an Inconsistent Cache State error, freeze the processor, halt the SYSBUS and issue an error interrupt.

VI Primary Event: Operand Cache Long Miss with Writeback

This event is handled in a manner similar to the handling of an Operand Cache Long Miss with Replacement. The only difference is that the block being replaced has been modified. This requires that the block be written back to the Secondary cache before the Operand cache is updated.

This event should occur only if the block being replaced is in state 14. If the block being replaced is in state 1, an instruction to Invalidate the block may have been received on the SYSBUS and serviced between the time the Operand Cache Long Miss with Writeback occurred and when it was serviced. For this reason state 1 will be considered a valid state to be in for the block being replaced. If the block to be replaced is in any other state (2 through 13) the Secondary cache will detect this as an Inconsistent Cache State error, freeze the processor, halt the SYSBUS, and issue an error interrupt.

SECONDARY LEVEL EVENTS

The handling of secondary or derivative events will now be described in detail. These events comprise the four types of secondary cache misses mentioned previously.

I Secondary Event: Secondary Cache Short Miss

A. Block in States 1, 6 through 14

The state of the block before the event:
Instruction Cache: Don't Care
Operand Cache: Don't Care
Secondary Cache: Invalid, Private or Modified If the block is in any of these states, a Secondary Cache Short Miss should not have occurred. If the block is marked as invalid in the Secondary cache, one of the Secondary cache long misses should have occurred. If the block was marked as private or modified in the Secondary cache, the processor already has the right to modify the data and no derivative need to have occurred.

B. Block in States 2 through 5

The state of the block before the event:
Instruction Cache: Don't Care
Operand Cache: Don't Care
Secondary Cache: Shared The state of the block after the event has been serviced:
Instruction Cache: Unchanged
Operand Cache: Unchanged
Secondary Cache: Modified The Secondary cache will broadcast an INVALIDATE instruction over the SYSBUS according to the SYSBUS protocol. Once the Invalidate has been successfully broadcast, the block will be marked as modified in the Secondary cache. The derivative event service will be considered complete at this point.

The marking of the block in the primary caches will not be changed by the derivative event service. The marking of the block will be changed during service of the primary event that caused the derivative event.

II Secondary Event: Secondary Cache Simple Long Miss

A. Block in State 1:

The state of the block before the event:
Instruction Cache: Invalid
Operand Cache: Invalid
Secondary Cache: Invalid The state of the block after the event has been serviced:
Instruction Cache: Invalid or Shared
Operand Cache: Invalid or Shared or Modified
Secondary Cache: Shared, Private or Modified If this event occurred during the service of an Instruction Cache Miss, the Secondary cache will broadcast a READ instruction onto the SYSBUS. Sometime after the instruction was successfully transmitted a WRITE instruction should be received, followed by the needed data. The data will be placed into the Instruction cache and the Secondary cache as it comes in off the SYSBUS. After the data has been received, the block will be marked as shared in the Instruction cache. The block will be marked as shared or private in the Secondary cache depending on the value of the OP field of the WRITE instruction.

When this event occurs during the service of an Operand Cache Miss, different actions will be taken if the Operand Cache Miss occurred due to a read operation or a write operation. If the event occurred due to a read operation, the Secondary cache will broadcast a READ instruction onto the SYSBUS. Later a WRITE instruction will be received, followed by the data. The data will be placed into the Operand cache and Secondary cache as it comes in off the SYSBUS. The block will be marked as shared in the Operand cache. It will be marked as shared or private in the Secondary cache depending on the value of the OP field of the WRITE instruction.

If the event occurred due to a write operation, the Secondary cache will broadcast a READ+INVALIDATE instruction onto the SYSBUS. Later a WRITE instruction will be received, followed by the data. The data will be placed into the Operand cache and Secondary cache as it comes off the SYSBUS. It will be marked as modified in both the Operand cache and the Secondary cache.

B. Block in States 2 through 14

The state of the block before the event:
Instruction Cache: Don't Care
Operand Cache: Don't Care
Secondary Cache: Shared, Private or Modified This event should never occur when the data block is in any of these states because the needed data is already in the Secondary cache.

III Secondary Event: Secondary Cache Long Miss with Replacement

This event will be serviced in a manner similar to the servicing of a Secondary Cache Simple Long Miss. The difference is that a block of data that has not been modified is being overwritten on the Secondary cache. If the block being replaced is also in the Instruction cache, the Secondary cache controller will invalidate the block in the Instruction cache. If the block is also in the Operand cache, the Secondary cache controller will invalidate the block in the Operand cache.

If this event occurred during the servicing of an Instruction Cache Miss with Replacement or an Operand Cache Long Miss with Replacement there is a chance that the block being replaced by the Secondary cache is the same block that is being replaced by the Primary cache. If this is the case, the secondary level invalidation is suppressed to prevent the data just given to the Primary cache from being invalidated by the Secondary cache. Otherwise, this will introduce an inconsistency into the cache system because the Secondary cache invalidates the new data thinking it was invalidating the block that was being replaced in the Secondary cache.

IV Secondary Cache Long Miss with Writeback

This event is handled in a manner similar to a Secondary Cache Long Miss with Replacement. The difference is that the block being replaced has been modified and therefore must be written back to main memory before it can be overwritten. If the event occurred due to an Instruction cache miss or an Operand cache miss during a read cycle, a READ+WRITEBACK request will be sent over the SYSBUS. If the event occurred due to an Operand cache miss during a write cycle, a READ+INVALIDATE+WRITEBACK request will be sent over the SYSBUS.

As in the previous event, the Secondary cache must check whether the block it is writing back is the same as the block that the Operand cache is writing back.

SYSBUS EVENTS

The immediately preceding discussion of secondary level events describes how and why SYSBUS events are initiated by the secondary cache controllers. The following discussion describes in detail the manner in which these SYSBUS events are serviced by the other devices on the SYSBUS.

Requests to the Secondary cache are normally serviced in a first come, first served order. However, if the Secondary cache is waiting for the SYSBUS in order to service a request from a Primary cache, state will be saved and the SYSBUS e will be serviced first.

I SYSBUS Event: INVALIDATE Instruction Received

A. Block in State 1

The state of the block before the event:
Instruction Cache: Invalid
Operand Cache: Invalid
Secondary Cache: Invalid
The state of the block after the event has been serviced:
Instruction Cache: Invalid
Operand Cache: Invalid
Secondary Cache: Invalid
The block is not present in the local cache so no action is taken and the instruction is ignored.

B. Block in State 2

The state of the block before the event:
Instruction Cache: Invalid
Operand Cache: Invalid
Secondary Cache: Shared
The state of the block after the event has been serviced:
Instruction Cache: Invalid
Operand Cache: Invalid
Secondary Cache: Invalid
Since the block is in the Secondary cache, the instruction will be acknowledged. The block will be marked as invalid in the Secondary cache.

C. Block in State 3

The state of the block before the event:
Instruction Cache: Shared
Operand Cache: Invalid
Secondary Cache: Shared
The state of the block after the event has been serviced:
Instruction Cache: Invalid
Operand Cache: Invalid
Secondary Cache: Invalid
Since the block is in the Secondary cache, the instruction will be acknowledged. The secondary cache controller will invalidate the block in the Instruction cache. The block will be marked as invalid in the Secondary cache.

D. Block in State 4

The state of the block before the event:
Instruction Cache: Invalid
Operand Cache: Shared
Secondary Cache: Shared
The state of the block after the event has been serviced:
Instruction Cache: Invalid
Operand Cache: Invalid
Secondary Cache: Invalid
Since the block is in the Secondary cache, the instruction will be acknowledged. The block will be invalidated in the Operand cache. The block will be marked as invalid in the Secondary cache.

E. Block in State 5

The state of the block before the event:
Instruction Cache: Shared
Operand Cache: Shared
Secondary Cache: Shared
The state of the block after the event has been serviced:
Instruction Cache: Invalid
Operand Cache: Invalid
Secondary Cache: Invalid
Since the block is in the Secondary cache, the instruction will be acknowledged. The block will be invalidated in the Instruction cache and in the Operand cache. The block will be marked as invalid in the Secondary cache.

F. Block in States 6 through 14

The state of the block before the event:
Instruction Cache: Don't Care
Operand Cache: Don't Care
Secondary Cache: Private or Modified
If an INVALIDATE instruction addressing a block in one of these states is received there is an inconsistency in the cache system. A device should transmit an INVALIDATE instruction only if it already has a copy of the data in its cache marked as shared. The local device believes it has the only copy of the block because the block is marked as Private or Modified in its Secondary cache.

II SYSBUS Event: READ Instruction Received

A. Block in State 1

The state of the block before the event:
Instruction Cache: Invalid
Operand Cache: Invalid
Secondary Cache: Invalid
The state of the block after the event has been serviced:
Instruction Cache: Invalid
Operand Cache: Invalid
Secondary Cache: Invalid
The block is not present in the local cache so no action is taken and the instruction is ignored.

B. Block in States 2 through 5

The state of the block before the event:
Instruction Cache: Don't Care
Operand Cache: Don't Care
Secondary Cache: Shared
The state of the block after the event has been serviced:
Instruction Cache: Unchanged
Operand Cache: Unchanged
Secondary Cache: Shared The SYSBUS protocol is designed such that when a block of data is marked as shared, the SCU services the instruction by the data from main memory. For this reason, no action is taken in a Secondary cache in which the data is marked as shared.

C. Block in States 6 through 9

The state of the block before the event:
Instruction Cache: Don't Care
Operand Cache: Don't Care
Secondary Cache: Private
The state of the block after the event has been serviced:
Instruction Cache: Unchanged
Operand Cache: Unchanged
Secondary Cache: Shared When the READ instruction requests a block that is marked as private, the Secondary cache will acknowledge the instruction, indicating that it will supply the data to the requester. The data is read from the Secondary cache and returned to the requester with the opcode of the WRITE instruction telling the requester to mark the data as shared in the requester's cache. The Secondary cache then marks the block as shared in the Secondary cache. The Primary caches are not involved in servicing this event.

D. Block in States 10 through 13

The state of the block before the event:
Instruction Cache: Don't Care
Operand Cache: Invalid or Shared
Secondary Cache: Modified
The state of the block after the event has been serviced:
Instruction Cache: Unchanged
Operand Cache: Unchanged
Secondary Cache: Shared A READ instruction for a block of data marked as modified is serviced in a manner similar to a READ instruction for a block of data marked as private. The only difference is that the data is returned to the requester using a WRITE+WRITEBACK instruction. This instruction sends the data to both the requester and the SCU. The WRITE+WRITEBACK instruction opcode used will tell the requester to mark the block as shared in the requester's cache. The Primary caches are not involved in servicing this event.

E. Block in State 14

The state of the block before the event:
Instruction Cache: Invalid
Operand Cache: Modified
Secondary Cache: Modified
The state of the block after the event has been serviced:
Instruction Cache: Invalid
Operand Cache: Shared
Secondary Cache: Shared The Secondary cache will acknowledge the instruction to indicate that it will return the data to the requester. The Secondary cache will force the Operand cache to write the modified block back to the Secondary cache. The data will be returned to the requester over the SYSBUS via a WRITE+WRITEBACK instruction. The WRITE+WRITEBACK instruction opcode used will tell the requester to mark the block as shared in the requester's cache. The block will then be marked as shared in both the Secondary cache and the Operand cache.

III SYSBUS Event: READ+INVALIDATE Instruction Received

A. Block in State 1

The state of the block before the event:
Instruction Cache: Invalid
Operand Cache: Invalid
Secondary Cache: Invalid
The state of the block after the event has been serviced:
Instruction Cache: Invalid
Operand Cache: Invalid
Secondary Cache: Invalid The block is not present in the local cache so no action is taken and the instruction is ignored.

B. Block in States 2 through 5

The state of the block before the event:
Instruction Cache: Invalid or Shared
Operand Cache: Invalid or Shared
Secondary Cache: Shared
The state of the block after the event has been serviced:
Instruction Cache: Invalid
Operand Cache: Invalid
Secondary Cache: Invalid Since the block is marked as shared, the Secondary cache will not acknowledge the message. This is because the SCU is supposed to supply the data when a block is shared between devices. The message is not ignored, however. If the block is valid in the Instruction cache, the Secondary cache invalidates the copy of the block in the Instruction cache. If the block is valid in the Operand cache the Secondary cache invalidates the block in the Operand cache. The Secondary cache then marks the block as invalid in all three caches.

C. Block in States 6 through 9

The state of the block before the event:
Instruction Cache: Invalid or Shared
Operand Cache: Invalid or Shared
Secondary Cache: Private
The state of the block after the event has been serviced:
Instruction Cache: Invalid
Operand Cache: Invalid
Secondary Cache: Invalid The Secondary cache will acknowledge the message to indicate that it will supply the data to the requester. If the block is valid in the Instruction cache it will be invalidated. If the block is valid in the Operand cache it will be invalidated. The data will be sent to the requester with a Write instruction on the SYSBUS. The opcode of the Write instruction will tell the requester to mark the block as modified in the requester's cache. The Secondary cache will then mark the block as invalid in all three caches.

D. Block in States 10 through 13

The state of the block before the event:
Instruction Cache: Invalid or Shared
Operand Cache: Invalid or Shared
Secondary Cache: Modified
The state of the block after the event has been serviced:

Instruction Cache: Invalid
Operand Cache: Invalid
Secondary Cache: Invalid

When the requested block is in one of these states a Read+Invalidate instruction is serviced in a manner similar to that described in the last paragraph. The opcode of this instruction will tell the requester to mark the block as modified in its cache.

E. Block in State 14

The state of the block before the event:
Instruction Cache: Invalid
Operand Cache: Modified
Secondary Cache: Modified The state of the block after the event has been serviced
Instruction Cache: Invalid
Operand Cache: Invalid
Secondary Cache: Invalid The Secondary cache will acknowledge the instruction and force the Operand cache to writeback the data into the Secondary cache and to invalidate the block. The Secondary cache will return the data with a WRITE instruction. The opcode of this instruction will tell the requester to mark the block as modified in its cache. The Secondary cache will then mark the block as invalid in all three caches.

Structure of the System Bus

The system bus of the present invention will now be described in greater detail.

The system bus of the present invention (SYSBUS) is a bi-directional, multi-drop bus capable of handling a plurality of arms.

Figure 6:
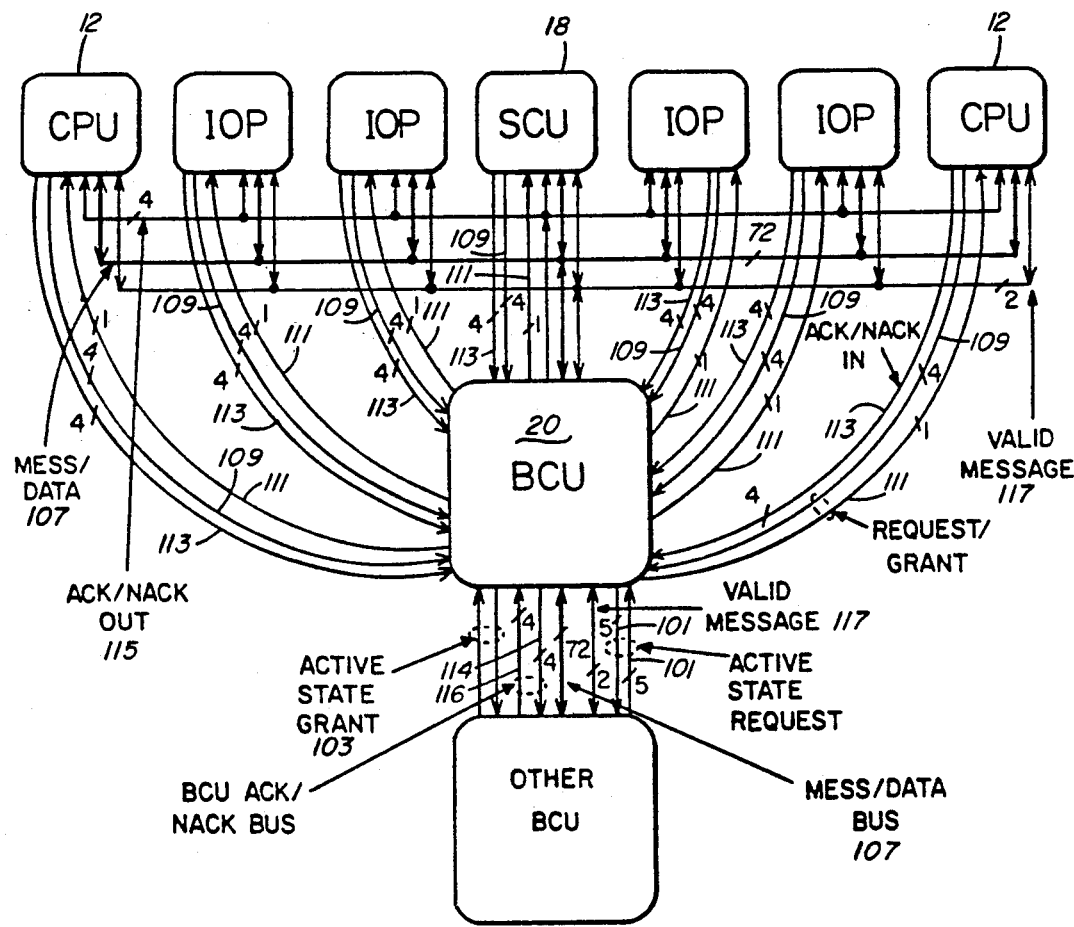
FIG. 6 is a block diagram of the multiprocessor system of the present invention showing the various portions of the system bus.

The SYSBUS comprises three subparts, the MESSAGE/DATA bus, the REQUEST/GRANT bus, and the BCU bus (in multi-arm systems). FIG. 6 shows a block diagram of an exemplary two-arm multiprocessor system showing the connections of all bits of the SYSBUS. FIG. 7 is a table showing the breakdown of bits of the SYSBUS in terms of their function.

The BCU 20 arbitrates the use of the MESSAGE/DATA bus 107. In a multi-arm system, a BCU bus ties all of the system's BCU's together and allows the BCUs to transfer control of the SYSBUS amongst themselves. The BCU bus comprises ten lines per arm (i.e., per BCU) in the multiprocessor system. Five of those lines comprise the unidirectional, single drop BCU REQUEST lines 101 (including a parity bit) for requesting control of the system bus. One bit each comprises the unidirectional, single drop BCU GRANT bit 103 wherein the BCU currently in control of the SYSBUS grants control to another requesting BCU. Finally, there are four (including a parity bit) unidirectional, single drop BCU ACK/NACK/HIT bits 114 and 116 per BCU whose function will be described shortly.

The REQUEST/GRANT bus ties each component to the BCU (only to the local BCU in a multi-arm system). The REQUEST/GRANT bus comprises five bits of uni-directional, single drop lines per device. Each device on the arm (seven devices in the above example) includes four REQUEST lines 109 coupled to the local BCU. When a device needs access to the MESSAGE/DATA bus, it sends out a request to the BCU on these four REQUEST lines 109 indicating that it requests the bus and also indicating the type of operation for which it needs access to the bus. There are seven uni-directional, single-drop GRANT bits 111 directed from the BCU back to the devices (one line for each device on the arm). The single bit merely indicates that the request is granted if in a first state and not granted if in a second state.

The MESSAGE/DATA bus handles all of the messages, instructions and data transfers between components of the multiprocessor system. The MESSAGE/DATA bus includes the message/data lines 107 themselves comprising 72 bits coupled between every device on the system for carrying messages and data and several additional bits (not necessarily coupled to every device on the system) for performing various protocol maintenance functions as will be described below. When in the DATA mode, the message/data portion carries sixty four bits of data and eight parity bits. When in the MESSAGE mode, it carries forty-eight bits of MESSAGE, which may include a main memory address along with an instruction, six bits which indicate the operation type, five bits each for indicating the source and destination of the instruction, and eight bits of parity.

The MESSAGE/DATA bus also includes four ACK/NACK/HIT-IN lines 113 per device. Each processing unit (and the SCU of the main memory) has a distinct set of four unidirectional, single drop ACK/NACK/HIT-IN lines coupling it to the local BCU. After an instruction is received on the SYSBUS, each Cprocessing unit activates its ACK/NACK/HIT-IN lines to inform the BCU if 1) it can respond to the instruction, 2) it has the data (if a READ instruction) and 3) whether it is unique or shared (if a READ instruction). Therefore, a system having six processors and a main memory, as described above, has a total of twenty-eight bits of uni-directional, single-drop ACK/NACK/HIT-IN lines. Further, there are four lines of uni-directional, multi-drop ACK/NACK/HIT-OUT lines 115 on which signals are sent from the BCU to all devices o the associated arm.

The MESSAGE/DATA bus comprises two additional bits, termed the VALID MESSAGE SIGNAL 117. This signal specifies what is currently on the bus. It has three primary states, namely (1) there is no operation on the bus, (2) there is a valid message on the bus, and (3) there is valid data on the bus. It also has a fourth state indicating the presence of invalid data on the bus. This state is used only when an uncorrectable data error is detected.

As stated, the main memory is coupled to the SYSBUS through the SCU. In a single arm embodiment of the invention, the SCU is coupled to the SYSBUS similarly to the processors. In a multi-arm system, there is an SCU for each arm connected between main memory and the SYSBUS

Operation of the System Bus

The operation of the ACK/NACK/HIT lines and signals will now be described in detail. Initially, the description will be limited to the ACK/NACK/HIT-IN and OUT lines 113 and 115 of the MESSAGE/DATA bus in a multi-processor system with only a single arm (BCU). The description will then be expanded to include the BCU ACK/NACK/HIT lines 114 and 116 of a multi-arm system. Each device receiving an instruction on the MESSAGE/DATA bus sends to the BCU over the ACK/NACK/HIT-IN lines a response which indicates (1) if the device is able to respond to the instruction, (2) whether it contains the requested data block and (3) whether it has a shared or unique copy of it. As stated, the ACK/NACK/HIT-IN lines comprise four bits. It comprises (1) an ACKNOWLEDGE line (ACK) which doubles as a UNIQUE line when responding to instructions requesting a read of a block of data, (2) a FAIL signal (NACK) which indicates that the instruction has not been acknowledged and probably will have to be resent, (3) a HIT signal which, when set, indicates that the requested data is marked as SHARED, and (4) a PARITY bit. FIG. 8 shows the possible states of the ACK/NACK/HIT-IN lines (not including the PARITY bit), along with a description of the meaning of the state. It should be noted that main memory (the SCU) does not acknowledge (ACK) instructions since the only instructions that it responds to are READ instructions and it is known that main memory has a copy of every data block in the system. The SCU will, of course, NACK on signals which it has not received correctly (this will usually occur when the READ buffer of the SCU is busy fulfilling an earlier READ instruction).

The BCU will assimilate the ACK/NACK/HIT-IN signals and output four, multi-drop ACK/NACK/HIT-OUT lines to inform the device which issued the instruction how the other devices on the system responded. The ACK/NACK/HIT-OUT lines will inform the device if any other devices acknowledged and/or failed to acknowledge the instruction, and whether other processors on the arm contain a shared or unique copy of the data. FIG. 9 shows the possible states of each set of ACK/NACK/HIT-OUT lines. A certain combination of bits on the ACK/NACK/HIT-OUT lines might have different meaning depending on the instruction to which it is responding. For instance, as shown in FIG. 9, the 1001 combination indicates that the processor has a unique copy of the data, if the instruction to which it is responding is a READ instruction. Otherwise, it would simply indicate that a device has acknowledged the instruction.

Both the instruction issuing cache and the SCU of the main memory observe the ACK/NACK/HIT-OUT lines. If the ACK/NACK/HIT-OUT lines indicate that a device which must respond to the instruction NACKED, then the instruction-issuing cache will resend the instruction. Otherwise, the instruction issuing device will continue with the next appropriate step; for instance if the instruction was a READ or READ AND INVALIDATE, the instruction issuing processor will await the writing of the data to its cache.

When data is written to a cache, for instance in response to a READ or a READ AND INVALIDATE instruction, the instruction field of the WRITE instruction notifies the processor to which it is writing the data how the tags associated with the data block which is being written should be set up in the receiving cache.

When a device requests a copy of a block of data, such as through a READ or a READ AND INVALIDATE instruction, the device issuing the READ instruction must be able to set up the data tags associated with that block of data in its cache to properly reflect the condition of the data when it is received (i.e., shared, private, or modified). In the protocol of the present invention, the ACK/NACK/HIT-OUT signals received in response to the READ (or READ AND INVALIDATE) instruction comprise the information necessary to determine the condition of the data to set up the tags properly. This information can also be determined by observing the device which provides the data (whether its the main memory or a cache) and, if it is a cache, the current condition of the data in that cache. The protocol of the present invention utilizes both sources of this information to provide a unique method of setting up the data tags in a cache which is receiving data.

The device which WRITES data back to the cache which issued the READ (or READ AND INVALIDATE) instruction includes in the message field of the WRITE instruction information as to how the data block is to marked in the receiving cache. If main memory is returning the data then the data can only be either shared or private. The main memory will know whether to inform the receiving cache to mark the data as shared or private based on the ACK/NACK/HIT-OUT lines which it observed in response to the original READ (or READ AND INVALIDATE) instruction. If no cache asserted HIT in response to the READ, then it is marked as private. Otherwise, it is marked as shared. When a cache returns data in response to a READ instruction, it is always returned as shared since, if the block is marked as private in the cache which is writing the data back to the requesting cache, after the WRITE is performed, two caches will contain copies which are consistent with main memory. Further, if the data block is marked as modified in the responding cache, then according to the protocol of the present invention, the responding cache not only writes the data back to the requesting cache but also to main memory. Therefore, the data block once again must be marked as shared in the requesting cache when it is received.

If a responding cache returns data to a requesting cache in response to a READ AND INVALIDATE instruction, the responding cache will always instruct the receiving cache that the data block is to be marked as modified. This is true because a READ AND INVALIDATE instruction is issued when the requesting cache plans to modify the data block. By definition, no other cache in the system will contain a valid copy of the data after a READ AND INVALIDATE instruction is executed.

If an instruction issuing cache receives a NACK in response to its instruction, it will resend the instruction over the SYSBUS except under the following circumstance; 1) the instruction included a READ portion, 2) main memory is the device which NACKED, and 3) another device (a cache) has ACKED on the message, indicating that it has the data block and it is marked as either private or modified. The instruction does not need to be resent because the main memory which NACKED, is not going to respond to the instruction anyway. In other words, a READ or a READ AND INVALIDATE instruction to which the ACK/NACK/HIT responses include both an ACK and a NACK do not need to be resent even though a device (main memory) NACKED.

The operation of the REQUEST/GRANT bus will now be described. As stated, the REQUEST/GRANT bus comprises two parts, the REQUEST lines and the GRANT lines. There are four REQUEST lines for each device on each arm. The BCU on each arm handles the requests for its arm. When a device (e.g., Cprocessing unit, SCU) needs access to the bus to perform an operation, it sends out a four-bit REQUEST signal to the local BCU over the REQUEST/GRANT bus. The four bit REQUEST signal, not only requests access to the bus, but informs the BCU of the type of operation for which the device needs the MESSAGE/DATA bus. The types of REQUESTS are listed in FIG. 10, in order of priority. The second column in FIG. 10, explains the situation in which a device issues the corresponding request signal.

The HALT request has the highest priority and is indicative of a condition in which a critical error has occurred. When the BCU receives a HALT request, all use of the bus will be halted in order to prevent further corruption of the system. In the meantime, however, processors not needing access to the bus can continue to operate without interference.

The BCU will examine all REQUEST lines from 11 devices on the associated arm (as well as the REQUEST lines portion of the BCU bus, as will be explained later) and grant bus access to the device having the highest priority request. The GRANT portion of the bus comprises a one-bit, single-drop, uni-directional line 111 coupled to each device. The BCU places a one on the GRANT line to the device to which it is granting bus access and a zero on all other grant lines. The highest priority device may then issue a message on the MESSAGE/DATA bus.

As shown in FIG. 9, of the sixteen possible combinations of the four bit ACK/NACK/HIT-OUT signals, only six are valid. The remaining ten possible combinations, would signify that an error exists. In such a situation, the SYSBUS must be halted and the maintenance processor notified. As shown in FIG. 9, the six possible states are as follows: (1) no device has responded to the instruction; (2) at least one cache reports that it has a shared copy of the data; (3) at least one device has not received the instruction properly; (4) at least one device NACK'd the instruction and at least one other device has a shared copy of the data; (5) at least one device has correctly received the instruction and, if the instruction to which it is responding is a READ, the device has a unique copy of the data; and (6) at least one device acknowledged the instruction and at least one other device did not correctly receive the instruction.

The sequence of events which occur on the SYSBUS depends on the issued message, the availability of the bus, the response of the other devices to the message and even whether the BCU of the arm with which the message-issuing device is associated currently has control of the bus or must obtain it from another BCU. However, the following general sequence of events occurs for most messages. For purposes of this discussion, it is still assumed that there is only a single BCU on the system. The sequence of events and protocol on the BCU bus portion of the SYSBUS will be described later. First, a device needing access to the SYSBUS places a request signal on the uni-directional, single-drop REQUEST lines to the BCU associated with its arm. Second, the BCU compares the priority level of the REQUEST with the priority level of any other REQUEST which might be pending and sends out a GRANT signal to the device with the highest priority REQUEST. A device continues to send out its REQUEST signal until it is granted access to the bus. Third, after the GRANT is issued, the device which has been granted access to the bus issues an instruction over the 72 bit bi-directional, multi-drop MESSAGE/DATA lines. If the instruction is a WRITE, for instance, the instruction would be followed by eight cycles of data. If, on the other hand, the instruction was a READ, no data would follow the instruction. Fourth, all devices check the instruction for a parity error. If there is a parity error, this will be indicated and the instruction issuing device will have to resend the instruction. Assuming, however, that there is no parity error, each device sends an ACK/NACK/HIT-IN message to its local BCU over the uni-directional, single-drop ACK/NACK/HIT-IN lines. Sixth, the BCU assimilates the data and outputs an ACK/NACK/HIT-OUT signal over the uni-directional, multi-drop ACK/NACK/HIT-OUT lines which is received by the instruction issuing device and main memory. If a device NACKed, then the instruction-issuing device may have to return to step three and reissue the instruction. The instruction does not have to be reissued, however, if a HIT and a NACK are received simultaneously. This would indicate that one cache has a unique (private or modified) copy of the data block and that main memory NACKed. Since main memory is not supposed to respond when a cache HIT occurs, the instruction does not have to be resent. If no device has NACKed or if the above-described situation has occurred, the process is complete and the system is set up to proceed with the next instruction. For instance, if the instruction was a READ instruction to which another device on the system must respond with a WRITE instruction, then, when the requested data was ready to be returned, the responding device would initiate a WRITE request for the bus (step 1) and proceed through the aforementioned general sequence of steps. The WRITE instruction which is issued in response to the READ instruction may not necessarily be the next instruction. Thus, other operations can be executed on the SYSBUS while the responding device is accessing the data.

As an example, when a cache controller issues a READ or a READ AND INVALIDATE instruction, another device will respond with a WRITE or WRITE AND WRITEBACK instruction. The simpler WRITE instruction is used when the data merely must be sent to the requesting device. The WRITE and WRITEBACK instruction, on the other hand, not only writes the specified data block to the device requesting a copy of it but also WRITES the data block back to main memory. The WRITE AND WRITEBACK instruction, for instance, will be used when a modified block of data is written to a device in response to a READ instruction as described above.

Further, sometimes a READ or READ AND INVALIDATE instruction must be accompanied by a WRITEBACK instruction. The protocol of the present invention does not provide a single instruction to execute a READ AND WRITEBACK or READ AND INVALIDATE AND WRITEBACK. Rather, the present invention provides READ AND WRITEBACK and READ AND INVALIDATE AND WRITEBACK requests for bus access. After the bus is granted to the requesting device, then the READ or READ AND INVALIDATE instruction is performed followed by a WRITEBACK instruction. The READ or READ AND INVALIDATE plus WRITEBACK situation will only occur under certain circumstances.

Such circumstances are when a data block which is tagged as modified in a cache must be removed to make room for another data block which is to be read into that cache. Under these circumstance, a READ followed by a WRITEBACK instruction will be performed rather than a simple READ; and a READ AND INVALIDATE AND WRITEBACK will be performed instead of simple READ AND INVALIDATE. The WRITEBACK instruction must be performed as a separate instruction from the READ (or READ AND INVALIDATE) instruction since it pertains to a different data block. The READ (or READ AND INVALIDATE) instruction pertains to the block that is being placed into the cache. The WRITEBACK instruction, on the other hand, pertains to the block that is being removed from that cache to make room for the data which is being READ. The WRITEBACK instruction writes the data block which is being removed to make room for the requested data block back to main memory so as to preserve a valid copy of the data. If the data was not written back to main memory, then the only valid copy of the data would be lost.

In the protocol of the present invention, the WRITEBACK instruction is performed after the READ or READ AND INVALIDATE instruction. Since the requested data block will not overwrite the data block which it is replacing until another device responds to the READ or READ AND INVALIDATE instruction with a WRITE instruction, the fact that the WRITEBACK is performed after the READ is generally not a problem. However, if main memory NACKs on the WRITEBACK portion of the instruction, then the WRITE in response to the READ may come in before the WRITEBACK is performed and overwrite the data block. The protocol of the present invention prevents this problem by including a SECOND CYCLE WRITEBACK instruction which has higher priority than any other bus instruction (except HALT). The SECOND CYCLE WRITEBACK instruction is issued only in the above identified situation wherein the main memory NACKED on a WRITEBACK. The SECOND CYCLE WRITEBACK, having higher priority will always be executed before any other bus operation.

Turning to a multi-arm system, the operation of the BCU bus will now be described in detail. The BCU bus is used for transferring control of the SYSBUS between BCUs. Each BCU receives request signals from the devices on the associated arm, as described above, and determines the highest priority request. If the BCU does not currently have control of the SYSBUS, it places the highest priority request it has received from its arm on the BCU REQUEST lines 101 of the BCU bus. The BCU having current control of the SYSBUS reads this data off the BCU REQUEST lines 101 and compares it with the BCU REQUEST lines from other BCUs as well as the highest priority local request (on the active arm). The active BCU then issues a BCU GRANT signal to the BCU having the highest priority request and the control of the SYSBUS is transferred to that BCU. The BCU REQUEST lines 101 of the BCU bus, as stated above, comprises five uni-directional, single drop bits for each BCU. The encoding of the BCU REQUEST lines is the same as the encoding of the REQUEST/GRANT bus signals shown in FIG. 10. The fifth bit of the BCU REQUEST lines is for parity. The BCU GRANT lines 103 of the BCU bus are also uni-directional and single drop.

The BCU bus also comprises four uni-directional, single drop ACK/NACK/HIT 114 and 116 from each BCU to every other BCU. These lines operate in substantially the same way as the ACK/NACK/HIT lines described in relation to the MESSAGE/DATA bus. In a multi-arm system comprising a BCU bus in addition to the MESSAGE/DATA bus and REQUEST/GRANT bus, the operation of the ACK/NACK/HIT lines is essentially as described above except with an additional step. In a multi-arm system, the 72 message/data lines of the MESSAGE/DATA bus are coupled to every device on the system, including devices on remote arms. Therefore, every device on the system receives every message on the MESSAGE/DATA bus. Every device on every arm responds to its local BCU with an ACK-/NACK/HIT-IN signal. All BCUs assimilate the ACK-/NACK/HIT-IN data from the local devices and formulate ACK/NACK/HIT-OUT signals. The BCUs which are remote from the arm on which the message issuing device is coupled transmit their ACK/NACK/-HIT-OUT signals over the BCU ACK/NACK/HIT lines and the BCU which is on the same arm as the message issuing device awaits receipt of these signals. This local BCU then assimilates the ACK/NACK/HIT information which it receives over the BCU bus with the local ACK/NACK/HIT-IN information and produces an ACK/NACK/HIT-OUT signal in accordance therewith. Similarly, the BCUs on remote arms receive the ACK/NACK/HIT information from the other BCUs and send an ACK/NACK/HIT-OUT signal to the devices on their arms. This is so that SCUs on remote arms may observe the ACK/NACK/HIT-OUT response and act accordingly.

Having described the structure and operation of the individual components of the SYSBUS, the overall protocol will now be described by use of examples and with a view towards illustrating the interaction of the components. FIG. 11 is a table of the protocol rules for use of the SYSBUS. The first column of FIG. 11, entitled "Instruction", lists the possible instructions which can be sent out from a device. This table is not complete and shows only such instructions as are related to servicing cache misses. Columns 2-4 illustrate the possible ACK/NACK/HIT responses to each of the possible instructions. Only the ACK/NACK/HIT-OUT signals are listed. The fifth column is merely a description of what the combination of ACK/NACK/HIT signals means. Finally, the sixth column describes what the device issuing the instruction does in response to the ACK/NACK/HIT-OUT signals.

There are bus request signals, such as READ+-WRITEBACK and READ+INVALIDATE+-WRITEBACK, which have no corresponding instruction. This is because, in the SYSBUS protocol, when a device needs to writeback data, such as in a READ+-WRITEBACK situation, the two steps are carried out separately. For example, in a READ+WRITEBACK situation, the device sends out two instructions, (1) a READ instruction, and (2) a WRITE TO MEMORY message. The reason why the bus request protocol provides for a READ+WRITEBACK request is for the purpose of priority considerations in granting the bus for the operation.

At this point, there are some features of the SYSBUS protocol which deserve special mention. First, the WRITEBACK request (on the REQUEST/GRANT bus) as well as the SECOND CYCLE WRITEBACK instruction (on the MESSAGE/DATA bus) are provided for a unique situation. If a device sends out a READ+WRITEBACK request over the REQUEST/GRANT bus and the memory NACKs, the WRITEBACK data can be lost. If another device responds to the READ+WRITEBACK message, the responding device will request access to the bus for a write of the data which was requested. If this write is granted, the responding device will write over the data in the device which issued the original READ+-WRITEBACK message before the writeback is performed, thereby, causing that piece of data to be lost.

The WRITEBACK request, as well as the SECOND CYCLE WRITEBACK instruction, eliminates this problem. Since the WRITEBACK request has higher priority than any other request (except for HALT), the WRITEBACK request will be granted before the WRITE request of the responding device.

As mentioned earlier, the SCU will respond by supplying requested data except when another device has a unique copy of the data. Therefore, the SCU watches the ACK/NACK/HIT-OUT lines for an ACK, a NACK, or an ACK and a NACK. If the SCU sees any of these in response to a read request, it shuts itself off. Otherwise, the SCU responds to the read request.

The valid message portion of the MESSAGE/DATA bus has an additional state for indicating when invalid data is on the bus. This fourth state is useful in processors in which a data error can occur but which is uncorrectable. For instance, in a preferred embodiment of the present invention, ECC hardware checks for errors in the data just before being placed on the SYSBUS. Thus, there is no way to know in advance of the SYSBUS transfer whether an uncorrectable error exists in the data. However, when an uncorrectable error is discovered by the ECC hardware just before being placed on the bus, the valid message portion of the bus can be changed from indicating valid data to invalid data. This action serves to warn the device receiving the data that the data is faulty and cannot be used.

The distributed BCU scheme of the present invention is advantageous. Logically, the protocol can be implemented with a single central BCU connecting all of the devices. However, the system of the present invention, in a preferred embodiment, comprises a multiplicity of arms, with each arm having its own dedicated BCU. With this distributed BCU scheme, if one of the arms fails for any reason, the system and the remaining arms still can be brought up and operated.

One more unique situation deserves mention. In the present invention, if two devices attempt to read the same block of data, the SYSBUS protocol handles this conflict easily since any given device is capable of servicing only one SYSBUS read instruction at a time. Therefore, the second of these reads will be NACKed by the device servicing the first read until data is returned to the first requester. This ensures cache consistency. However, if a device issues a read instruction to a block which is marked in one or more caches as shared, this data will be returned by the memory subsystem rather than any of the caches. If, while this data is being accessed from the memory subsystem, another device issues an INVALIDATE instruction to the same block (because it had a write hit on the block and it is in the shared state), and then it writes to the block after the INVALIDATE, the data that is returned from the SCU to the original read requester will be stale. In order to prevent this from happening, the SCU monitors INVALIDATE instructions on the SYSBUS, and compares their addresses with the address in its read buffer. If a match is detected, the SCU NACKs the INVALIDATE instruction until it has completed servicing the read request. Therefore, the INVALIDATE instruction will be continuously retried until the read has been service, thus insuring consistency.

Figure 12:
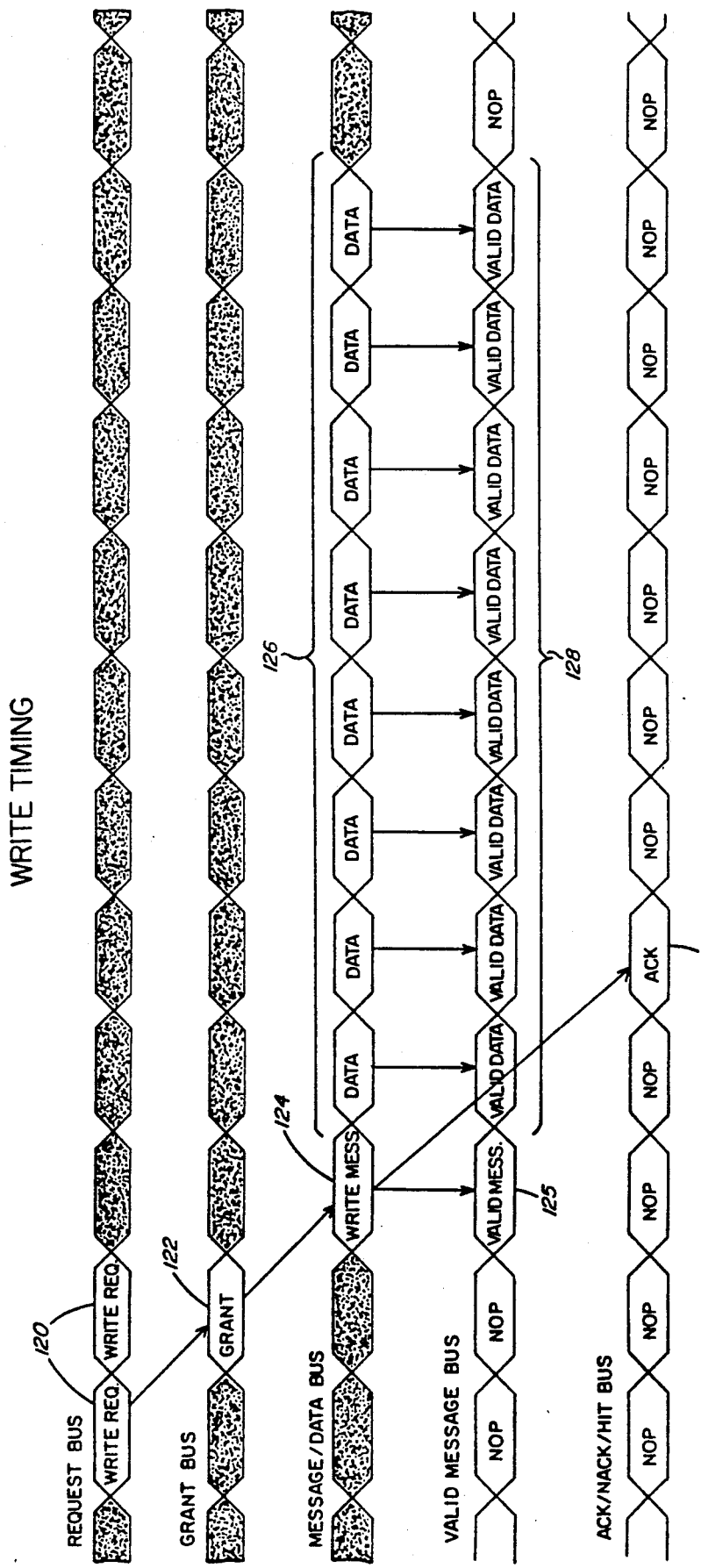
FIG. 12 is a timing diagram showing information transfer on various portions of the system bus in response to a write request.
Figure 13:
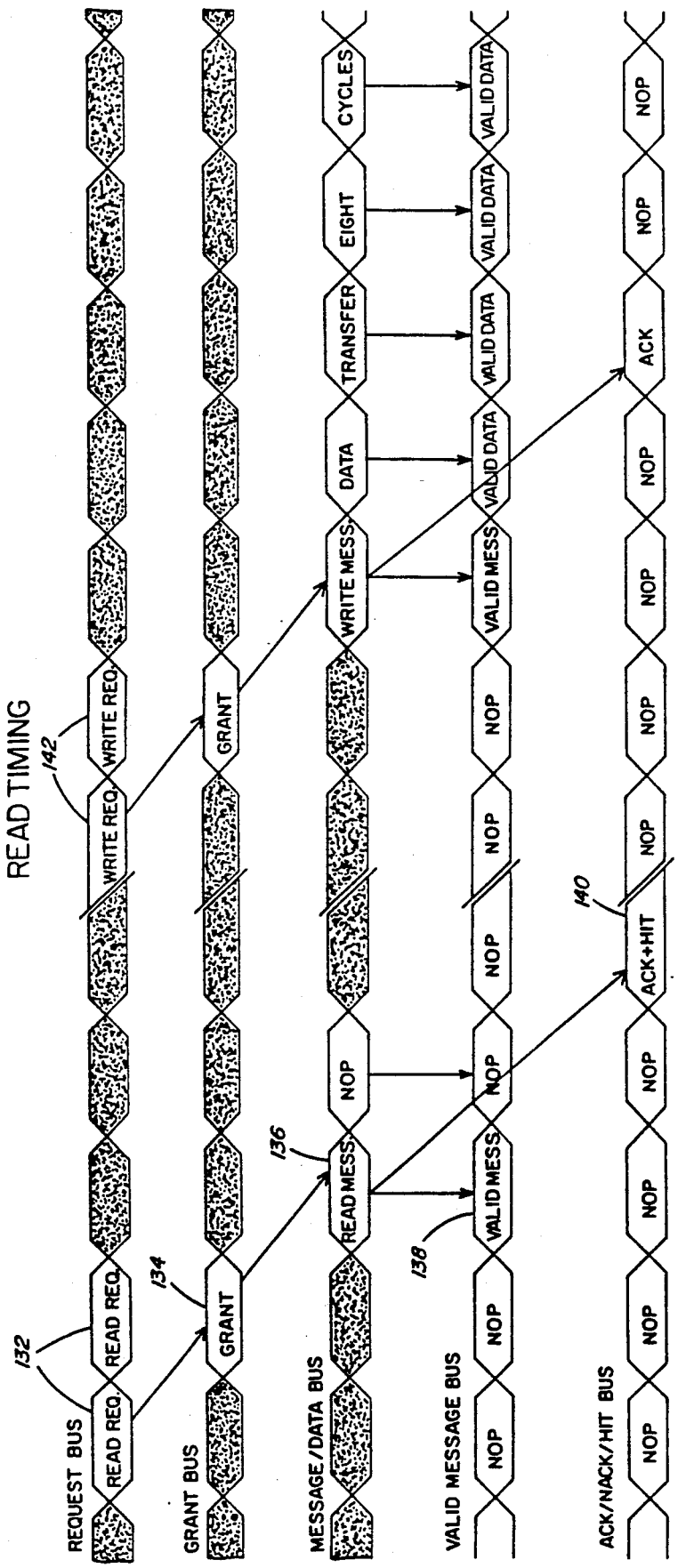
FIG. 13 is a timing diagram showing information transfer on various portions of the system bus in response to a READ request.
Figure 14:
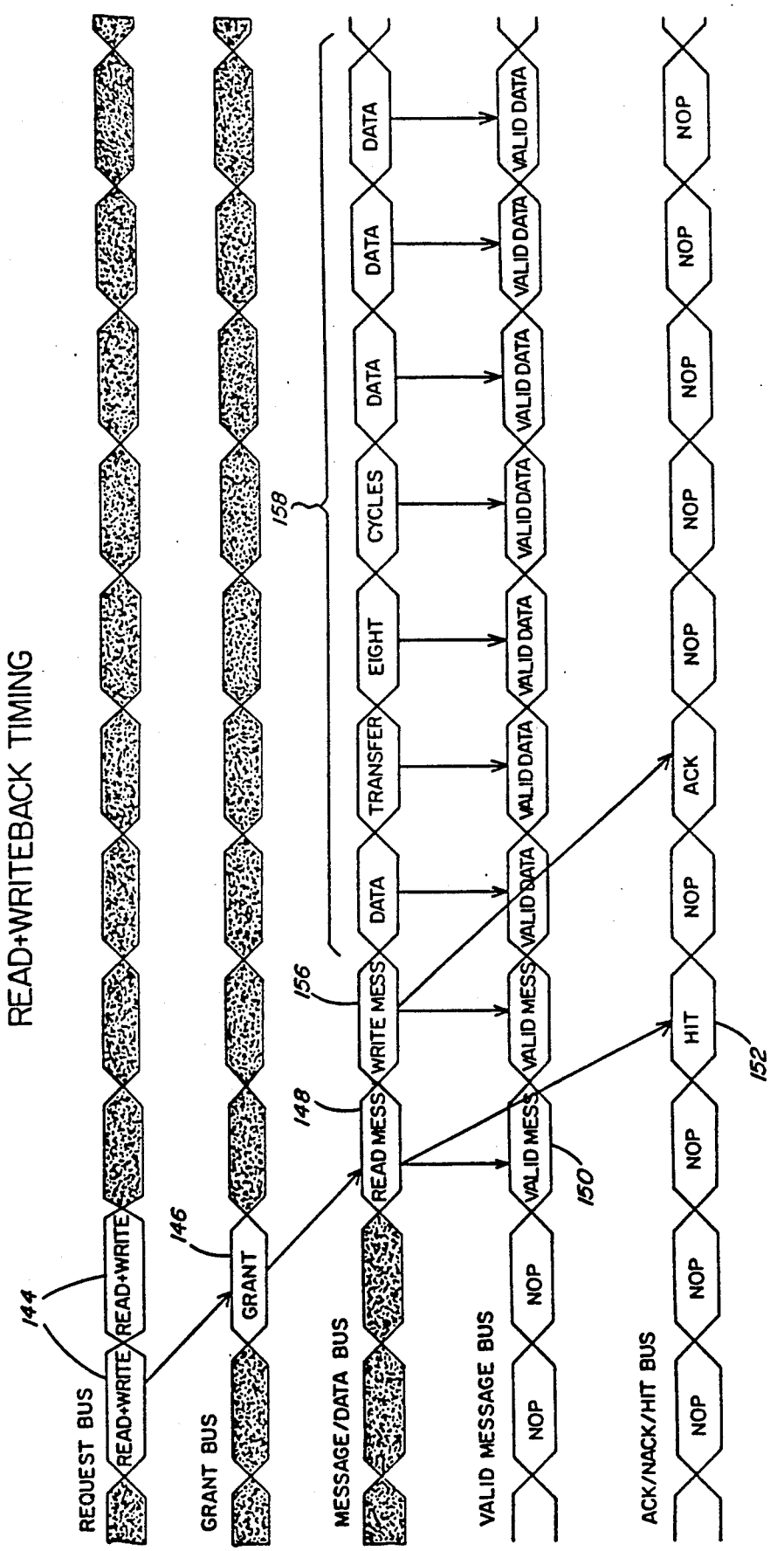
FIG. 14 is a timing diagram showing information transfer on various portions of the system bus in response to a READ AND WRITEBACK request.
Figure 15:
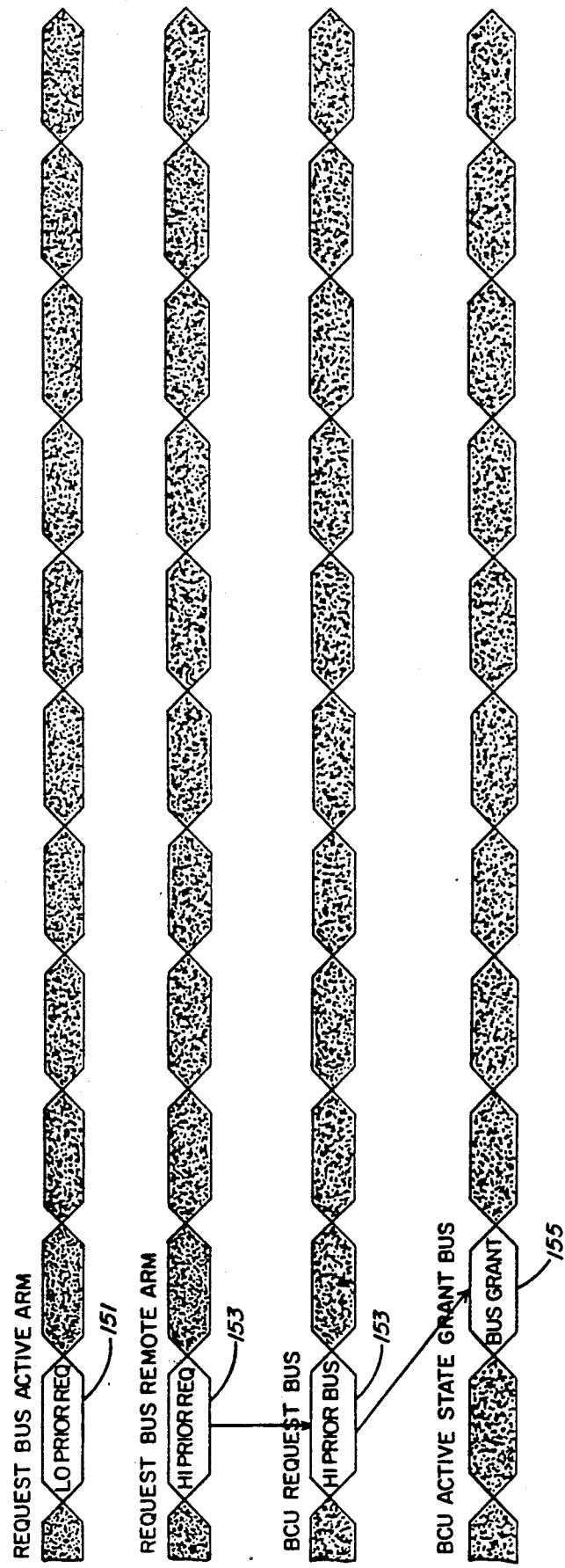
FIG. 15 is a timing diagram showing information transfer on various portions of the system bus in response to a BCU active state request.

The following examples should serve to illustrate the SYSBUS protocol of the present invention. Timing diagrams of important system operations are shown in FIGS. 12-16 for each example. FIGS. 12, 13 and 14 relate to single arm system (or transfer on the active arm). FIG. 15 is a timing diagram relating to transfer of control between BCUs. FIG. 16 shows the whole process, i.e., a data transfer between remote arms.

BLOCK WRITE REQUEST: Refer to FIG. 12

1. The simplest transfer is a block write. The device wanting to write puts the code for BLOCK WRITE REQUEST 120 (1100 for low priority and 1101 for high priority) on its REQUEST lines and waits for a grant.

2. The BCU will grant the bus at some future time and output the grant code 122 (1) on the appropriate grant line.

3. The device will first put a write instruction 124 on the MESSAGE/DATA bus and at the same time put a valid message code 125 (01) on the valid message lines.

4. For the next eight cycles, the device will put data 126 on the MESSAGE/DATA bus and qualify it with the valid data code 128 (10) on the valid message lines.

5. All devices on the SYSBUS will check the parity on the instruction. If there is a parity error, the device will put out a halt instruction which will halt the SYSBUS and require maintenance processor intervention. If there is no error and the instruction destination ID matched the device number, then the device will send back an ACK/UNIQUE (110) signal 130 on the ACK/NACK/HIT lines.

6. If the sender receives a NACK on the instruction then it will try to resend the instruction. If the sender gets a NACK on data this is the signal of a HALT and it must hold onto the instruction.

7. For more details see PROTOCOL TABLE, FIG. 11.

BLOCK READ REQUEST: Refer to FIG. 13

1. When a device wants a block of data it must put a BLOCK READ REQUEST 132 (1000 for low priority and 1001 for high priority) on its request bus and wait for a grant.

2. The BCU will grant the bus at some future time. The BCU will output the grant code 134 (1) on the appropriate grant line.

3. The device will first put a READ instruction 136 on the MESSAGE/DATA bus and at the same time put a valid message code 138 (01) on the valid message lines.

4. The receiving devices will check the instruction for parity and, if there is an error, the SYSBUS will be halted. If parity is correct and a cache has the data then it will send back an ACK/UNIQUE message if the data is unique or a HIT if the data is shared 140. If its buffer is full it will send back a NACK. If a device does not have a copy of the data, it will not respond.

5. If the sender receives a NACK it will have to resend the instruction. If the device that NACKED was not the SCU then the SCU will observe the NACK and shut off.

6. If the data was unique in a cache, then the device will prepare to send the data back. The SCU, seeing the ACK/UNIQUE will shut off. If the data was shared, the cache can forget about the request and the SCU will send back the data.

7. The device sending the data back will put out a write request 142.

8. From this point the write timing follows the WRITE REQUEST TIMING see FIG. 12.

9. For more details see PROTOCOL TABLE table 1-11.

READ+WRITEBACK TIMING: Refer to FIG. 14

1. A device puts a BLOCK READ+WRITEBACK REQUEST 144 (011X) on its request bus and waits for a grant.

2. The BCU will grant the bus at some future time. The BCU will output the grant code 146 (1) on the appropriate grant line.

3. The device will first put a READ instruction 148 on the MESSAGE/DATA bus and at the same time put a valid message code 150 (01) on the valid message lines.

4. The receiving devices will check the instruction for parity and if there is an error the SYSBUS will be halted. If parity is correct and a cache has the data then it will send back an ACK/UNIQUE if the data is unique or a HIT 152 if the data is shared. If its buffer is full it will send back a NACK.

5. If the sender receives a NACK it will have to resend the instruction. If the device that NACKed was not the SCU, the SCU will observe the NACK and shut off.

6. If the data was unique then the cache will prepare to send the data back. The SCU, seeing the ACK-/UNIQUE, will shut off. If the data was shared, the cache can forget about the request and the SCU will send back the data.

7. The following cycle is the WRITEBACK (i.e. write to memory) instruction 156 on the MESSAGE/DATA BUS followed by eight cycles of data 158.

8. Now the cache location is empty for the data to read in. In the event memory NACKS, the VERY High priority WRITEBACK request is used so the data is written to memory before the read data comes back BCU ACTIVE STATE REQUEST TIMING: Refer to FIG. 15

1. The BCU on the remote or inactive arm takes all of the requests from its arm and transfers the highest 153 to the active BCU over the BCU REQUEST BUS.

2. When the request 153 from another BCU is of a higher priority than the highest priority request 151 on the currently active arm, the active BCU grants 155 the active state to the inactive BCU with the highest priority request.

3. This transfer does not take place until the MESSAGE/DATA BUS is free from the current operation.

CACHE HIT REMOTE ARM: Refer to FIG. 8

In this example, a read request is made but the only cache hit is on a remote arm. In FIG. 8 the busses shown are as follows:

| | |
|---|---|
| REQUEST BUS | request bus active arm |
| GRANT BUS | grant bus active arm |
| REMOTE REQUEST BUS | request bus inactive arm |
| REMOTE GRANT BUS | grant bus inactive arm |
| MESSAGE/DATA BUS | system MESSAGE/DATA bus |
| VALID MESSAGE lines | system valid message bus |
| ACKNOWLEDGE lines | ACK/NACK/HIT-OUT lines |
| BCU ACTIVE STATE REQUEST BUS | request bus from inactive BCU to active BCU |
| BCU ACTIVE STATE GRANT BUS | grant bus from active BCU to inactive BCU |

1. The process is the same as the READ request timing (See FIG. 13) except when the data comes back the ACTIVE STATE has to be passed to the other BCU.

2. When the device has the data to send back it puts out a HIGH PRIORITY WRITE REQUEST 158 (1101).

3. This request is the highest request on the inactive arm. Therefore, the remote BCU puts the request on the BCU ACTIVE STATE REQUEST BUS 160.

4. The active BCU gets the HIGH PRIORITY WRITE REQUEST from the remote arm and, since it is higher than its arm's requests, it makes the remote BCU the active BCU by sending the ACTIVE BCU GRANT CODE 162 (1) on the BCU ACTIVE STATE GRANT BUS.

5. Now that the remote BCU is active it can grant the HIGH PRIORITY WRITE REQUEST that is on its arm 164. The sequence now follows the WRITE REQUEST example above.

6. For more details see PROTOCOL TABLE.

The above described method and apparatus provides extremely fast memory access time for the vast majority of data fetches by using a bi-level memory buffer associated with each processor. System efficiency is further increased by use of a system bus access protocol which greatly reduces the use of the SYSBUS for servicing cache misses.

Having thus described one particular embodiment of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of maintaining coherence amongst a plurality of devices including a main memory and a plurality of caches in a multiprocessor computer system having a system bus and a plurality of processors, each processor having a cache associated therewith, said system bus being coupled between all devices in said multiprocessor computer system, and said caches containing copies of data blocks stored in said main memory, and comprising the steps of:

appending to each data block stored in a cache, tag bits which indicate the condition of the associated data block in relation to other copies of the data block in the multi-processor system, said condition of said data block may comprise one of the group of conditions comprising: (1) invalid, (2) shared, (3) private and (4) modified, wherein shared, private and modified are valid states, and wherein (1) invalid indicates that the associated copy of the data block may be incorrect, (2) shared indicates that the associated copy of the data block is correct and equivalent to the copy in main memory and that other caches may contain a correct copy of the data block, (3) private indicates that the associated data block is correct and equivalent to the copy in main memory and that no other cache contains a valid copy of the data block, and (4) modified indicates that the associated data block is not equivalent to the corresponding copy in main memory and no other cache contains a valid copy of the data block;

when a first processor having an associated first cache is to operate on a data block in such a manner as to possibly alter its condition as indicated by the tag bits in one or more caches in the computer system, said first cache issuing over said system bus to all other devices an instruction identifying said data block and the type of operation, each cache other than said first cache responding to said instruction by issuing over said system bus a response message indicating if it received the instruction properly, if it has a copy of said data block, and, when the instruction includes a READ operation, whether the cache is the only cache having a copy of the data, assimilating the response messages of all caches to produce a collective response message which indicates to said first cache the condition in which the data block will be in said cache after the instruction is executed, executing said instruction, and updating the tag bits in said first cache in accordance with said collective response message, updating the tag bits in each of said caches responding to said instruction in accordance with said instruction, when said instruction is a READ, the method including the additional steps of, said READ instruction requesting that another device send a valid copy of said data block to said first cache, if said data block is marked as shared in any cache, said main memory writing said data block back to said first cache and instructing said first cache to update said tag bits to mark said data block as shared in said first cache, if said data block is marked as private in any one cache, the cache having the data block writing it to said first cache, said one cache updating said tag bits in said one cache to mark said data block as shared and instructing said first cache to update said tag bits of said data block in said first cache to mark said data block as shared, if said data block is marked as modified in any one cache, the cache having the data block writing it to said first cache and said main memory, the processor associated with said one cache updating the tag bits in said one cache to mark said data block as shared and instructing said first cache to update said tag bits of said data block in said first cache to mark said data block as shared, and if said data block is not valid in any cache, said main memory providing said data block to said first cache and instructing said first cache to update said tag bits to marks said data block as private in said first cache.

2. A method as set forth in claim 1 wherein, when said instruction is a READ AND INVALIDATE, said READ AND INVALIDATE instruction requesting that another cache or main memory send a valid copy of said data block back to said first caches and that the other processors update the tag bits in their associated caches to mark said data block as invalid, if said data block is marked as shared in any cache, said main memory providing said data block to said first cache and instructing said first cache to update said tag bits to mark said data block as modified in said first cache and all other caches on said computer system which contain a copy of said data block updating said tag bits to mark said data block as invalid, if said data block is marked as private in any one cache, said one cache providing it to said first cache, said one cache updating the tag bits in said one cache to mark said data block as invalid and instructing said first cache to update said tag bits to mark said data block as modified in said first cache, and if said data block is marked as modified in any one cache, said one cache providing said data block to said first cache and said main memory, said one cache updating the tag bits in said one cache to mark said data block as invalid and instructing said first cache to update said tag bits to mark said data block as modified in said first cache, and if said data block is not valid in any cache, said main memory providing said data block to said first cache and instructing said first cache to update said tag bits to mark said data block as modified in said first cache.

3. A method as set forth in claim 2 wherein, when said instruction is an INVALIDATE instruction, all caches containing a copy of said data block updating the tag bits to mark said data block as invalid in the associated cache.

4. A method as set forth in claim 3 wherein, if a device indicates that it has not received an instruction properly, said first cache reissues said instruction unless 1) said main memory is the device which did not properly receive the instruction, 2) said instruction included a READ portion, and 3) a cache has a copy of the data block involved in said instruction which is marked as private or modified.

5. A method as set forth claim 4 wherein, when 1) a first cache needs to obtain a first data block, 2) said first cache needs to remove a copy of a second data block to provide space for said first data block and 3) the tag bits of said copy of said second data block indicate it is modified, said first cache issuing one of 1) a READ instruction followed by a WRITEBACK instruction and 2) a READ AND INVALIDATE instruction followed by a WRITEBACK instruction, wherein, said WRITEBACK instruction forwards said second data block to said main memory so as to replace any previous copy of said second data block stored in said main memory.

6. A method as set forth in claim 5 wherein, said WRITEBACK portion of said instruction is performed after said one of said READ and READ AND INVALIDATE portions.

7. A method as set forth in claim 6 wherein, if said main memory did not properly receive said WRITEBACK instruction, said first cache issuing a SECOND CYCLE WRITEBACK instruction forwarding said second data block to the appropriate place in said main memory so as to replace any previous copy of said second data block stored in said main memory, and said SECOND CYCLE WRITEBACK instruction having higher priority than any other instruction so as to ensure that said second data block is preserved in main memory before another device WRITES said first data block back to said first cache.

8. A method as set forth in claim 7 wherein, if a device detects an error in the transmission of data and the multiprocessor system is unable to correct the error, said device which detected said error issuing a HALT instruction over the system bus, said HALT instruction preventing any device from gaining access to said system bus.

9. A method as set forth in claim 1 wherein, if any cache in the multiprocessor system has a data block having tag bits marking it as private or modified and said data block is the subject of an instruction which includes a READ operation issued over said system bus by a first cache, said cache providing said data block to said first cache, and said main memory providing said data block to said first cache otherwise.

10. A system bus apparatus for a multicache computer system comprising a plurality of devices including a main memory and a plurality of caches, wherein, each cache has associated therewith a cache for storing copies of data blocks contained in main memory and tag bits associated with each data block, which tag bits indicate the condition of the associated copy of a data block in relation to other copies of that data block in the system, said system bus apparatus comprising, a multi-drop, bidirectional MESSAGE/DATA bus coupled to every device in the system for transferring instructions and data between devices, a bus control unit for arbitrating access to said MESSAGE/DATA bus, unidirectional, single drop ACK/NACK/HIT-IN lines associated with and coupling each cache and said main memory to said bus control unit, said ACK/NACK/HIT-IN lines used by each device to respond to instructions received over said MESSAGE/DATA bus, said ACK/NACK/HIT-IN lines comprising;

1) an ACK line which, when set, indicates that the associated cache has correctly received the instruction and, if the instruction includes a READ portion, that the associated cache contains a unique copy of the data block, 2) a NACK line which, when set, indicates that the device has not correctly received the instruction, and 3) a HIT line which, when set, indicates that the associated cache contains a copy of the data block that is consistent with the copy of said data block in said main memory, unidirectional, multi-drop ACK/NACK/HIT-OUT lines coupling said bus control unit to each processor and said main memory, said ACK/NACK/HIT-OUT lines containing data assimilated by said bus control unit, which data informs the processor which issued said instruction and said main memory how all the devices responded to said instruction so as to allow said main memory and said cache issuing said instruction to respond appropriately.

11. A system bus apparatus as set forth in claim 10 wherein, said condition of a data block may comprise one of the group of conditions comprising: 1) invalid, 2) shared, 3) private and 4) modified, wherein shared, private and modified are valid states, and;

1) invalid means the associated copy of the data block may be incorrect, 2) shared means the associated copy of the data block is correct and equivalent to the copy in main memory and that other caches may contain a correct copy of the data block, 3) private means the associated data block is correct and equivalent to the copy in main memory and that no other cache contains a valid copy of the data block, and 4) modified means the associated data block is not equivalent to the corresponding copy in main memory and no other cache contains a valid copy of the data block.

12. A system bus apparatus as set forth in claim 11 wherein, if the ACK/NACK/HIT-OUT lines in response to an instruction including a READ portion indicate that at least one cache has said data block marked as shared, said main memory providing said data block to said cache issuing said instruction.

13. A system bus apparatus as set forth in claim 12 wherein, if the ACK/NACK/HIT-OUT lines in response to an instruction including a READ portion indicate that one cache contains a private or modified copy of said data block, said one cache providing said data block to said processor issuing said instruction.

14. A system bus apparatus as set forth in claim 13 wherein, if a device indicates that it has not received an instruction properly, said processor which issued said instruction reissuing said instruction unless 1) said main memory is the device which did not properly receive the instruction, 2) said instruction included a READ portion, and 3) a cache has a copy of the data block involved in said instruction which is marked as private or modified.

15. A system bus apparatus as set forth in claim 14 wherein, when 1) a first cache needs to obtain a first data block, 2) said first cache needs to remove a copy of a second data block to provide space for said first data block, and 3) the tag bits of said copy of said second data block indicate it is modified, said first processor issuing one of 1) a READ instruction followed by a WRITEBACK instruction and 2) a READ AND INVALIDATE instruction followed by a WRITEBACK instruction, respectively, wherein, said WRITEBACK instruction forwards said second data block to said main memory so as to replace any previous copy of said second data block stored in said main memory with said modified copy of said second data block.

16. A system bus apparatus as set forth in claim 15 wherein, when said instruction is an INVALIDATE instruction, all caches containing a copy of said data block updating the tag bits to mark said data block as invalid in the associated cache.

17. A system bus apparatus as set forth in claim 13 wherein, when a first cache issues a READ instruction, said READ instruction requesting that another device send a valid copy of said data block to said first cache, if said data block is marked as shared in any cache, said main memory writing said data block back to said first cache and instructing said first cache to update said tag bits to mark said data block as shared in said first cache, if said data block is marked as private in and one cache, the cache having the data block writing it to said first cache, said one cache updating said tag bits in said one cache to mark said data block as shared and instructing said first cache to update said tag bits of said data block in said first cache to mark said data block as shared, if said data block is marked as modified in any one cache, the cache having the data block writing it to said first cache and said main memory, said one cache updating said tag bits in said one cache to mark said data block as shared and instructing said first cache to update said tag bits of said data block in said first cache to mark said data block as shared, and if said data block is not valid in any cache, said main memory providing said data block to said first cache and instructing said first cache to update said tag bits to mark said data block as private in said first cache.

18. A system bus apparatus as set forth in claim 17 wherein, when said instruction is a READ AND INVALIDATE, said READ AND INVALIDATE instruction requesting that another cache or main memory send a valid copy of said data block back to said first cache and that the other processors update the tag bits in the associated caches to mark said data block as invalid, if said data block is marked as shared in any cache, said main memory providing said data block to said first cache and instructing said first cache to update said tag bits to mark said data block as modified in the associated cache and all other caches on said computer system which contain a copy of said data block updating said tag bits in the associated caches to mark said data block as invalid, if said data block is marked as private in any one cache, said one cache providing it to said first cache, said one cache updating the tag bits in said one cache to mark said data block as invalid and instructing said first processor to update said tag bits to mark said data block as modified in the associated cache, and if said data block is marked as modified in any one cache, said one cache providing said data block to said first processor, said one cache updating the tag bits in said one cache to mark said data block as invalid and instructing said first cache to update said tags to mark said data block as modified in said first cache, and if said data block is not valid in any cache, said main memory providing said data block to said first cache and instructing said first cache to update said tag bits to mark said data block as modified in said first cache.

19. A system bus apparatus as set forth in claim 10 further comprising, a REQUEST/GRANT bus which comprises;

a plurality of unidirectional, single drop REQUEST lines coupling each device to said bus control unit for allowing each device to inform said bus control unit when said device requests access to said MESSAGE/DATA bus and to indicate the type of bus operation for which it is requesting the bus, means within said bus control unit for observing said REQUEST lines, and granting access to that device issuing the highest priority request signal, and a plurality of GRANT lines coupling said bus control unit to each device for issuing a GRANT signal to that device issuing the highest priority request.

20. A system bus apparatus as set forth in claim 19 wherein, HALT is the highest priority REQUEST signal and wherein HALT indicates that a device has discovered an incorrectible error and instructs the bus control unit to suspend all bus operations.

21. A system bus apparatus as set forth in claim 20 further comprising a plurality of arms, each arm comprising a bus control unit, a plurality of processors, and a REQUEST/GRANT bus and wherein each bus control unit services the REQUEST/GRANT bus of one arm of said system and further wherein each bus control unit includes means for transferring control of said MESSAGE/DATA bus to another bus control unit.

22. A system bus apparatus as set forth in claim 21 further comprising a bus control unit bus including, a plurality of unidirectional, single drop bus control unit REQUEST lines coupling each bus control unit, to each other bus control unit, a plurality of unidirectional, single-drop bus control unit GRANT line coupling each bus control unit to each other bus control unit, means within each bus control unit for determining the highest priority REQUEST signal received from a device on its arm, means within each bus control unit for placing said highest priority REQUEST signal on the bus control unit REQUEST lines coupled to the bus control unit currently having control of said MESSAGE/DATA bus, means within each bus control unit for determining, in response to said bus control unit REQUEST lines, which bus control unit has the highest priority request signal, a GRANT line coupled between each bus control unit and each other bus control unit for allowing the bus control unit currently having control of said MESSAGE/DATA bus to grant control to another bus control unit, and means within each bus control unit for placing a GRANT signal on the GRANT line coupled to the bus control unit having the highest priority request on said bus control unit REQUEST lines.

23. A system bus apparatus as set forth in claim 22 further comprising a system control unit on each arm coupled between said main memory and said bus control unit of each arm, said system control unit controlling access to said main memory.

24. A system bus apparatus as set forth in claim 23 further comprising, single drop unidirectional bus control unit ACK-/NACK/HIT lines coupled from each bus control unit to each other bus control unit, means within each bus control unit for placing said ACK/NACK/HIT-OUT signals on said bus control unit ACK/NACK/HIT lines, means within each bus control unit for assimilating said bus control unit ACK/NACK/HIT lines with said ACK/NACK/HIT-IN lines of the associated arm and outputting on said ACK/NACK/HIT-OUT lines of said associated arm to said processor which issued said instruction and said main memory how all the devices responded to said instruction.

25. A system bus apparatus as set forth in claim 24 wherein said main memory is coupled to said system bus through a storage control unit.

26. A method of maintaining coherence amongst a plurality of devices including a main memory and a plurality of caches in a multiprocessor computer system having a system bus and a plurality of processors, each processor having a cache associated therewith and said processors being grouped into a plurality of arms, each arm having at least two processors and a bus control unit for arbitrating access by said processors to said system bus, said system bus being coupled between all devices in said multiprocessor computer system, and said caches containing copies of data blocks stored in said main memory, and comprising the steps of:

- appending to each data block stored in a cache, tag bits which indicate the condition of the associated data block in relation to other copies of the data block in the multi-processor system, said condition of said data block may comprise one of the group of conditions comprising: (1) invalid, (2) shared, (3) private and (4) modified, wherein shared, private and modified are valid states, and wherein
  (1) invalid indicates that the associated copy of the data block may be incorrect,
  (2) shared indicates that the associated copy of the data block is correct and equivalent to the copy in main memory and that other caches may contain a correct copy of the data block,
  (3) private indicates that the associated data block is correct and equivalent to the copy in main memory and that no other cache contains a valid copy of the data block, and
  (4) modified indicates that the associated data block is not equivalent to the corresponding copy in main memory and no other cache contains a valid copy of the data block;
- when a first processor having an associated first cache is to operate on a data block in such a manner as to possibly alter its condition as indicated by the tag bits in one or more caches in the computer system, said first cache issuing over said system bus to all other devices an instruction identifying said data block and the type of operation;
- said main memory responding to said instruction by issuing a response message indicating if it has received the message properly;
- each cache other than said first cache responding to said instruction by issuing over said system bus a response message indicating if it received the instruction properly, if it has a copy of said data block, and, when the instruction includes a READ operation, whether the cache is the only cache having a copy of the data;
- assimilating the response messages of all caches to produce a collective response message which indicates to said first cache the condition in which the data block will be in said first cache after the instruction is executed;
- executing said instruction;
- updating the tag bits in said first cache in accordance with said collective response message;
- updating the tag bits in each of said caches responding to said instruction in accordance with said instruction;
- when said instruction is a READ, the method including the additional steps of,
- said READ instruction requesting that another device send a valid copy of said data block to said first cache, if said data block is marked as shared in any cache, said main memory writing said data block back to said first cache and instructing said first cache to update said tag bits to mark said data block as shared in said first cache;
- if said data block is marked as private in any one cache, the cache having the data block writing it to said first cache, said one cache updating said tag bits in said one cache to mark said data block as shared and instructing said first cache to update said tag bits of said data block in said first cache to mark said data block as shared;
- if said data block is marked as modified in any one cache, the cache having the data block writing it to said first cache and said main memory, the processor associated with said one cache updating said tag bits in said one cache to mark said data block as shared and instructing said first cache to update said tag bits of said data block in said first cache to mark said data block as shared; and
- if said data block is not valid in any cache, said main memory providing said data block to said first cache and instructing said first cache to update said tag bits to mark said data block as private in said first cache;
- when said instruction is a READ AND INVALIDATE, said READ AND INVALIDATE instruction requesting that another cache or main memory send a valid copy of said data block back to said first caches and that the other processors update the tag bits in their associated caches to mark said data block as invalid, when said instruction is a READ AND INVALIDATE, the method including the additional steps of,
- if said data block is marked as shared in any cache, said main memory providing said data block to said first cache and instructing said first cache to update said tag bits to mark said data block as modified in said first cache and all other caches on said computer system which contain a copy of said data block updating said tag bits to mark said data block as invalid,
- if said data block is marked as private in any one cache, said one cache providing it to said first cache, said one cache updating the tag bits in said one cache to mark said data block as invalid and instructing said first cache to update said tag bits to mark said data block as modified in said first cache, and
- if said data block is marked as modified in any one cache, said one cache providing said data block to said first cache and said main memory, said one cache updating the tag bits in said one cache to mark said data block as invalid and instructing said first cache to update said tag bits to mark said data block as modified in said first cache, and
- if said data block is not valid in any cache, said main memory providing that data block to said first cache and instructing said first cache to update said tag bits to mark said data block as modified in said first cache.

27. A method of maintaining coherence amongst a plurality of devices including a main memory and a plurality of caches in a multiprocessor computer system having a system bus and a plurality of processors, each processor having a cache associated therewith, said system bus being coupled between all devices in said multiprocessor computer system, and said caches containing copies of data blocks stored in said main memory, and comprising the steps of:

- appending to each data block stored in a cache, tag bits which indicate the condition of the associated data block in relation to other copies of the data block in the multi-processor system, said condition of said data block may comprise one of the group of conditions comprising: (1) invalid, (2) shared, (3) private and (4) modified, wherein shared, private and modified are valid states, and wherein
(1) invalid indicates that the associated copy of the data block may be incorrect,
(2) shared indicates that the associated copy of the data block is correct and equivalent to the copy in main memory and that other caches may contain a correct copy of the data block,
(3) private indicates that the associated data block is correct and equivalent to the copy in main memory and that no other cache contains a valid copy of the data block, and
(4) modified indicates that the associated data block is not equivalent to the corresponding copy in main memory and no other cache contains a valid copy of the data block;
when a first processor having an associated first cache is to operate on a data block in such a manner as to possibly alter its condition as indicated by the tag bits in one or more caches in the computer system, said first cache issuing over said system bus to all other devices an instruction identifying said data block and the type of operation;
each cache other than said first cache responding to said instruction by issuing over said system bus a response message indicating if it has a copy of said data block;
assimilating the response messages of all caches to produce a collective response message which indicates to said first cache the condition in which the data block will be in said first cache after the instruction is executed;
executing said instruction;
updating the tag bits in said first cache in accordance with said collective response message;
updating the tag bits in each of said caches responding to said instruction in accordance with said instruction;
when said instruction is a READ AND INVALIDATE, said READ AND INVALIDATE instruction requesting that another cache or main memory send a valid copy of said data block back to said first caches and that the other processors update the tag bits in their associated caches to mark said data block as invalid, when said instruction is a READ AND INVALIDATE, the method including the additional steps of,
if said data block is marked as shared in any cache, said main memory providing said data block to said first cache and instructing said first cache to update said tag bits to mark said data block as modified in said first cache and all other caches on said computer system which contain a copy of said data block updating said tag bits to mark said data block as invalid,
if said data block is marked as private in any one cache, said one cache providing it to said first cache, said one cache updating the tag bits in said one cache to mark said data block as invalid and instructing said first cache to update said tag bits to mark said data block as modified in said first cache, and
if said data block is marked as modified in any one cache, said one cache providing said data block to said first cache and said main memory, said one cache updating the tag bits in said one cache to mark said data block as invalid and instructing said first cache to update said tag bits to mark said data block as modified in said first cache, and
if said data block is not valid in any cache, said main memory providing said data block to said first cache and instructing said first cache to update said tag bits to mark said data block as modified in said first cache.

28. A method of maintaining coherence amongst a plurality of devices including a main memory and a plurality of caches in a multiprocessor computer system having a system bus and a plurality of processors, each processor having a cache associated therewith, said system bus being coupled between all devices in said multiprocessor computer system, and said caches containing copies of data blocks stored in said main memory, and comprising the steps of:
appending to each data block stored in a cache, tag bits which indicate the condition of the associated data block in relation to other copies of the data block in the multi-processor system, said condition of said data block may comprise one of the group of conditions comprising: (1) invalid, (2) shared, (3) private and (4) modified, wherein shared, private and modified are valid states, and wherein
(1) invalid indicates that the associated copy of the data block may be incorrect,
(2) shared indicates that the associated copy of the data block is correct and equivalent to the copy in main memory and that other caches may contain a correct copy of the data block,
(3) private indicates that the associated data block is correct and equivalent to the copy in main memory and that no other cache contains a valid copy of the data block, and
(4) modified indicates that the associated data block is not equivalent to the corresponding copy in main memory and no other cache contains a valid copy of the data block;
when a first processor having an associated first cache is to operate on a data block in such a manner as to possibly alter its condition as indicated by the tag bits in one or more caches in the computer system, said first cache issuing over said system bus to all other devices an instruction identifying said data block and the type of operation;
each cache other than said first cache responding to said instruction by issuing over said system bus a response message indicating if it has a copy of said data block;
assimilating the response messages of all caches to produce a collective response message which indicates to said first cache the condition in which the data block will be in said first cache after the instruction is executed;
executing said instruction;
updating the tag bits in said first cache in accordance with said collective response message;
updating the tag bits in each of said caches responding to said instruction in accordance with said instruction;
when said instruction is a READ, the method including the additional steps of:
said READ instruction requesting that another device send a valid copy of said data block to said first cache, if said data block is marked as shared in any cache, said main memory writing said data block back to said first cache and instructing said first cache to update said tag bits to mark said data block as shared in said first cache;

if said data block is marked as private in any one cache, the cache having the data block writing it to said first cache, said one cache updating said tag bits in said one cache to mark said data block as shared and instructing said first cache to update said tag bits of said data block in said first cache to mark said data block as shared;

if said data block is marked as modified in any one cache, the cache having the data block writing it to said first cache and said main memory, the processor associated with said one cache updating said tag bits in said one cache to mark said data block as shared and instructing said first cache to update said tag bits of said data block in said first cache to mark said data block as shared; and if said data block is not valid in any cache, said main memory providing said data block to said first cache and instructing said first cache to update said tag bits to mark said data block as private in said first cache.

* * * * *